United States Patent [19]
Yamazaki et al.

[11] Patent Number: 6,032,753
[45] Date of Patent: Mar. 7, 2000

[54] CATALYST TEMPERATURE CONTROL APPARATUS FOR HYBRID VEHICLE

[75] Inventors: Suehiro Yamazaki, Susono; Kaoru Ohtsuka, Misima; Takahide Izutani, Susono, all of Japan

[73] Assignee: Toyota Jidosha Kabushiki Kaisha, Toyota, Japan

[21] Appl. No.: 08/867,069

[22] Filed: Jun. 2, 1997

[30] Foreign Application Priority Data

Jun. 10, 1996 [JP] Japan .................................. 8-171819

[51] Int. Cl.$^7$ ...................................................... B60K 1/00
[52] U.S. Cl. .................. 180/65.3; 180/65.2; 180/309; 60/284; 60/285; 60/286; 60/300; 60/303
[58] Field of Search .............................. 60/284, 285, 286, 60/300, 303; 180/65.2, 65.3, 65.4, 309

[56] References Cited

U.S. PATENT DOCUMENTS

| | | | |
|---|---|---|---|
| 5,265,418 | 11/1993 | Smith | 60/284 |
| 5,385,017 | 1/1995 | Harada | 60/284 |
| 5,492,190 | 2/1996 | Yoshida | 60/300 |
| 5,566,774 | 10/1996 | Yoshida | 60/300 |

FOREIGN PATENT DOCUMENTS

| | | |
|---|---|---|
| U-6-4344 | 1/1994 | Japan . |
| A 6-178401 | 6/1994 | Japan . |
| A 7-71236 | 3/1995 | Japan . |

*Primary Examiner*—Thomas E. Denion
*Attorney, Agent, or Firm*—Oliff & Berridge, PLC

[57] ABSTRACT

In an engine mounted on a hybrid vehicle, even in an atmosphere that readily cools down a catalyst by relatively low-temperature gaseous exhausts, for example, under a fuel cut control, the structure of the invention quickly warms up the catalyst and maintains a conversion efficiency of the gaseous exhausts at a high level. When it is determined that an engine 10 is in operation and the fuel cut control is being performed, a reflux valve is turned on to reflux the gaseous exhausts into an intake conduit. This control procedure enables the relatively low-temperature gaseous exhausts to be refluxed to the intake conduit, instead of flowing into the catalyst, thereby preventing the catalyst from being cooled down.

9 Claims, 23 Drawing Sheets

6,032,753

CATALYST TEMPERATURE CONTROL APPARATUS FOR HYBRID VEHICLE

BACKGROUND OF THE INVENTION

1. Field of the Invention

The present invention relates to a hybrid vehicle provided with an engine and a motor for driving the vehicle, and more specifically to a catalyst temperature control apparatus for warming up a catalyst that converts gaseous exhausts of the engine.

2. Description of the Related Art

A catalyst carried on an exhaust system of the engine is generally not activated at temperatures of lower than a predetermined level and can not convert the gaseous exhausts at a high efficiency. There are, however, some cases, in which the temperature of the catalyst is lower than the predetermined level; for example, under a fuel cut control or at the time of a cool start. Known techniques for enhancing the conversion efficiency of the catalyst in such cases include those disclosed in JAPANESE PATENT LAYING-OPEN GAZETTE No. 7-71236 and No. 6-178401. In these known techniques, a heater is placed near the catalyst and turned on to heat the catalyst when the temperature of the catalyst decreases to or below a predetermined level, thereby enabling the catalyst to maintain the high conversion efficiency of the gaseous exhausts.

The prior art techniques utilize the electric power supplied from a battery or the electric power converted from a driving force of the engine and generated by a generator, so as to actuate the heater and heat the catalyst through heat conduction. This structure, however, causes the problems of a slow supply of the electric power in some charging states of the battery and a poor response to the temperature increase.

A hybrid vehicle, on which an engine and a motor work in combination, has been proposed and expected to improve the fuel consumption rate and the emission characteristics of the gaseous exhausts. The hybrid vehicle can use the electric power stored in the battery and run only by the driving force of the motor. On the hybrid vehicle, the engine can be driven by the power smaller than the required energy for running, and a fuel cut control that temporarily cuts a supply of fuel to the engine may be carried out frequently and for a long time period. The temperature of the catalyst is often lowered to an undesirably low level in such cases. The technique for warming up the catalyst more quickly and efficiently has thus been highly demanded.

SUMMARY OF THE INVENTION

The object of the present invention is thus to provide a catalyst temperature control apparatus for a hybrid vehicle, which warms up a catalyst quickly and efficiently and maintains a high conversion efficiency of gaseous exhausts even in a specific driving state of an engine, in which a catalyst is cooled down by relatively low-temperature gaseous exhausts.

At least part of the above and the other related objects is realized by a first catalyst temperature control apparatus for a hybrid vehicle, which includes: a motor connected to a drive shaft, which drives wheels, for rotating the drive shaft; an engine for generating energy required for driving the hybrid vehicle; and a catalyst disposed in an exhaust conduit of the engine for converting gaseous exhausts. The first catalyst temperature control apparatus of the invention includes: reflux means having a reflux conduit for connecting an upstream portion of the exhaust conduit arranged before the catalyst to an intake conduit of the engine, and an reflux valve for opening and closing the reflux conduit; fuel cut control means for carrying out a fuel cut control that temporarily cuts a supply of fuel into the engine; and reflux control means for, when the fuel cut control means carries out the fuel cut control, controlling the reflux valve of the reflux means, in order to reflux the gaseous exhausts to the intake conduit.

The hybrid vehicle has the motor and the engine mounted thereon, and can be driven only by the driving force of the motor. The hybrid vehicle is thus set frequently to be under a fuel cut control or in a driving state of the reduced power. On the hybrid vehicle, the following control is carried out to prevent the catalyst from being cooled down by the gaseous exhausts discharged from the exhaust conduit of the engine and lowering its conversion efficiency.

The first catalyst temperature control apparatus of the present invention has the reflux means, the exhaust temperature detection means, and the reflux control means. When a fuel cut control that temporarily cuts a supply of fuel is carried out or when the temperature of the gaseous exhausts or the catalyst is not higher than a predetermined value, the reflux control means controls the reflux means to reflux the gaseous exhausts of relatively low-temperature to the intake conduit. The structure of the first catalyst temperature control apparatus enables the gaseous exhausts cooled by the fuel cut control to be returned to the intake conduit and inhibits a flow of the low-temperature gaseous exhausts to the catalyst. This prevents the catalyst from being cooled down to have a low conversion efficiency and does not release the heat of the gaseous exhausts output from the engine, thereby enhancing the thermal efficiency.

The present invention is also directed to a second catalyst temperature control apparatus for a hybrid vehicle, which includes: a motor connected to a drive shaft, which drives wheels, for rotating the drive shaft; an engine for generating energy required for driving the hybrid vehicle; and a catalyst disposed in an exhaust conduit of the engine for converting gaseous exhausts. The second catalyst temperature control apparatus includes: an intake valve arranged at an intake opening for introducing the air from an intake conduit of the engine into a cylinder; an exhaust valve arranged at an exhaust opening for discharging the gaseous exhausts from the cylinder to the exhaust conduit; intake and exhaust valves driving means for turning on and off the intake valve and the exhaust valve and varying an overlap period, in which the intake valve and the exhaust valve are opened simultaneously; exhaust temperature detection means for measuring a temperature of either one of the gaseous exhausts and the catalyst; and intake and exhaust valves control means for, when the temperature measured by the exhaust temperature detection means is not higher than a predetermined value, controlling the intake and exhaust valves driving means, in order to lengthen the overlap period of the intake valve and the exhaust valve.

The second catalyst temperature control apparatus of the present invention has the intake and exhaust valves driving means for varying the overlap period, in which the intake valve and the exhaust valve are opened simultaneously, as well as the intake and exhaust valves control means for lengthening the overlap period. In case that a longer overlap period is set, the gaseous exhausts containing a high-temperature, high-pressure non-combusted gas are flown to the catalyst and combusted in the vicinity of the catalyst, so as to increase the temperature of the catalyst quickly.

The present invention is further directed to a third catalyst temperature control apparatus for a hybrid vehicle, which includes: a motor connected to a drive shaft, which drives wheels, for rotating the drive shaft; an engine for generating energy required for driving the hybrid vehicle; and a catalyst disposed in an exhaust conduit of the engine for converting gaseous exhausts. The third catalyst temperature control apparatus includes: engine power regulation means for regulating an engine power; exhaust temperature detection means for measuring a temperature of either one of the gaseous exhausts and the catalyst; and engine power control means for, when the temperature measured by the exhaust temperature detection means is not higher than a predetermined value, carrying out a transient control that temporarily increases the engine power to raise the temperature of the gaseous exhausts, via the engine power regulation means.

In the third catalyst temperature control apparatus of the present invention, under the condition of the low engine power, when it is determined that the temperature of the gaseous exhausts or the catalyst is not higher than a predetermined value based on a detection signal of the exhaust temperature detection means, the engine power control means carries out the transient control that temporarily increases the engine power. In case that the temperature of the gaseous exhausts has been lowered to cool down the catalyst, the engine power is quickly enhanced to raise the temperature of the gaseous exhausts and thereby the temperature of the catalyst. This structure directly heats the catalyst with the hot gaseous exhausts, thereby ensuring a good response to the temperature increase of the catalyst and a high efficiency.

The transient control carried out by the engine power control means may increase an engine torque while keeping an engine speed at a substantially constant level, or alternatively increase the engine speed while keeping the engine torque at a substantially constant level.

In this structure, the engine power enhanced by the transient control is converted to the electric power output from a generator. This prevents the driving power of the vehicle from tentatively and abruptly varying. In the transient control, the electric power output from the generator may be stored in a storage battery or supplied to the other electrical appliances mounted on the vehicle.

The transient control may change the engine power control appropriately according to a predetermined condition, for example, according to the remaining charge of the storage battery. When the remaining charge of the storage battery is lower than a predetermined level, the transient control increases the engine speed while keeping the engine torque at a substantially constant level. When the remaining charge of the storage battery is not lower than the predetermined level, on the other hand, the transient control increases the engine torque while keeping the engine speed at a substantially constant level. In the state of the low remaining charge of the storage battery, the generator is driven at a high revolving speed and the storage battery is charged quickly with a high charging efficiency. In the state of the high remaining charge of the storage battery, on the contrary, the engine is driven at a relatively low revolving speed, in order to reduce the engine noise.

In accordance with one application of the present invention, the catalyst temperature control apparatus has exhaust valve driving means for regulating the opening timing of an exhaust valve. The exhaust valve driving means advances the opening timing of the exhaust valve when the gaseous exhausts have a relatively low temperature. This structure enables the gaseous exhausts containing a high-temperature, high-pressure non-combusted gas to be flown to the catalyst and combusted in the vicinity of the catalyst, so as to increase the temperature of the catalyst quickly.

In accordance with another application of the present invention, the catalyst temperature control apparatus has exhaust pressure regulation means for enhancing the exhaust pressure in the vicinity of the catalyst. The exhaust pressure regulation means is controlled to enhance the exhaust pressure, when the temperature of the gaseous exhausts is not higher than a predetermined value. This structure keeps the catalyst sufficiently warm by the gaseous exhausts of high pressure.

In accordance with still another application of the present invention, the catalyst temperature control apparatus has sealing means for sealing the catalyst in the exhaust conduit and sealing control means for, when the temperature of the gaseous exhausts is not higher than a predetermined value, sealing the catalyst via the sealing means. This structure prevents a flow of the gaseous exhausts of the relatively low temperature to the catalyst and keeps the catalyst sufficiently warm. It is preferable that pressure reduction means is further disposed in the exhaust conduit to prevent a starting failure due to the excessively high pressure of the exhaust conduit while the sealing means seals the catalyst. The pressure reduction means releases the pressure in the sealed portion to the exterior.

The exhaust temperature detection means may be means for actually measuring the temperature of the gaseous exhausts or the catalyst or otherwise means for estimating the temperature of the gaseous exhausts or the catalyst based on a driving state of the engine, such as an engine load or an engine speed. In accordance with one preferable application, the exhaust temperature detection means includes both the temperature detection means and the temperature estimation means. This structure compares the observed temperature with the estimated temperature, and adopts the estimated temperature as the temperature of the gaseous exhausts or the catalyst when the temperature difference exceeds a predetermined level. Even when the temperature detection means is located in the atmosphere that readily lowers the precision of measurement by the accumulated deposit in the exhaust conduit, this structure enables the catalyst warm-up control continuously and stably.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
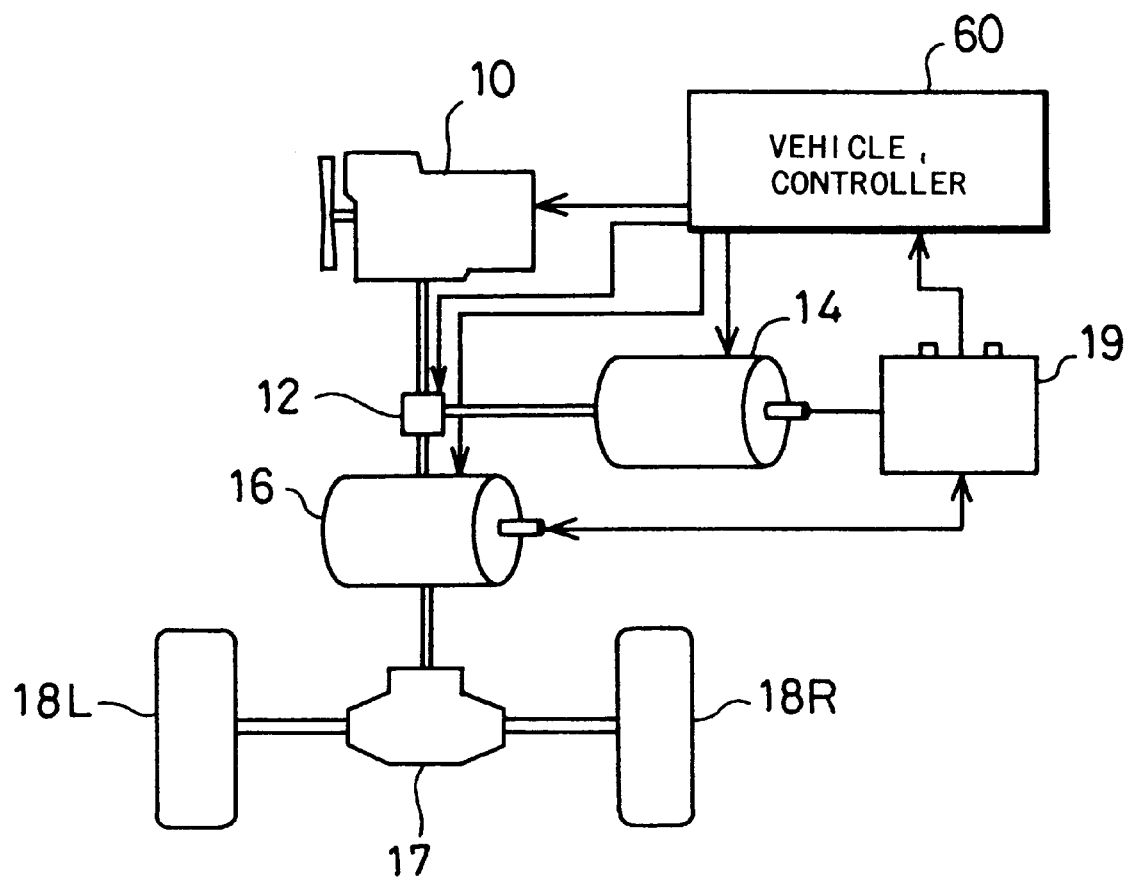
FIG. 1 schematically illustrates a hybrid vehicle, on which an engine with a catalyst temperature control apparatus embodying the present invention is mounted.

As shown in FIG. 1, the hybrid vehicle adopts a mechanical distribution system, in which engine output is distributed by a planetary gear unit 12, in order to drive driving wheels 18R, 18L directly and actuate a generator 14, thereby driving a motor 16 with the electric power thus generated. The hybrid vehicle is provided with an engine 10 that receives a supply of fuel from a fuel tank (not shown) and is driven with the supplied fuel. An output shaft of the engine 10 is connected with the planetary gear unit 12. The planetary gear unit 12 is further linked with the generator 14 and the motor 16. Rotational motion of the output shaft of the engine 10 is transmitted to either one or both of the generator 14 and the motor 16 via the planetary gear unit 12. An output shaft of the motor 16 is connected to a differential gear 17 to be eventually linked with driving wheels 18R and 18L of the vehicle. The generator 14 is connected to a battery 19. The battery 19 is charged with the electric power output from the generator 14 and is discharged to supply the motor 16 with the electric power.

Figure 2:
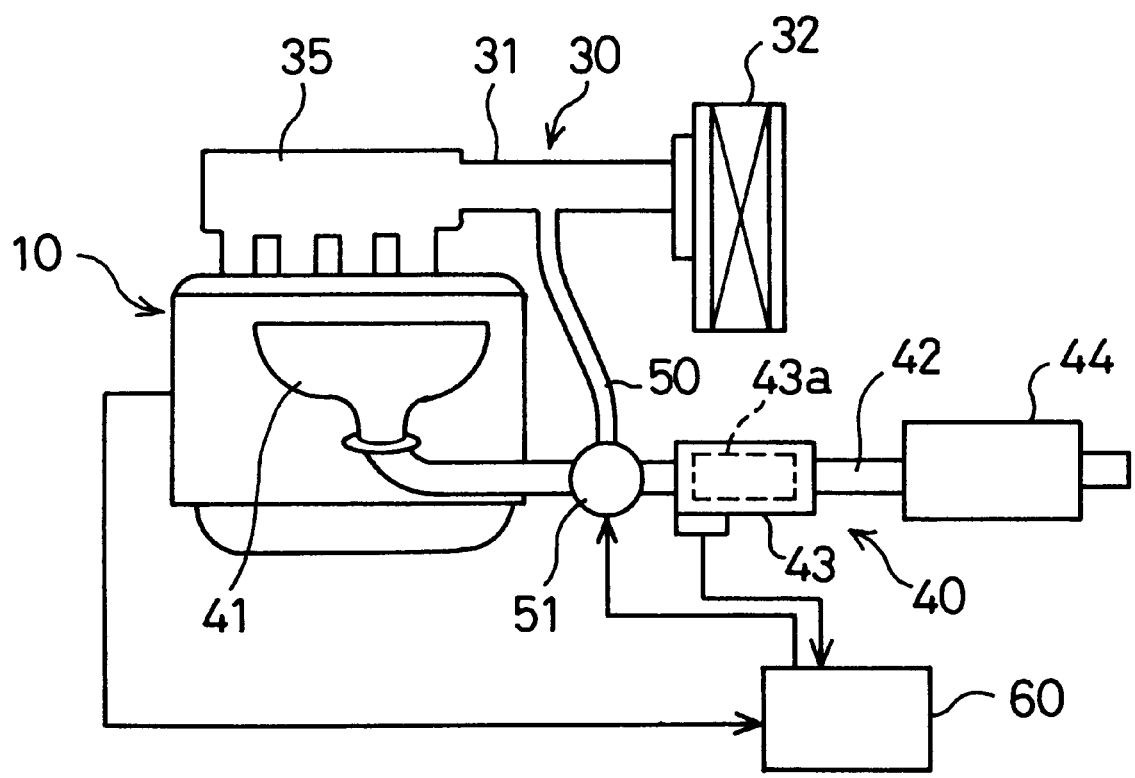
FIG. 2 schematically shows the exterior of the engine.
Figure 3:
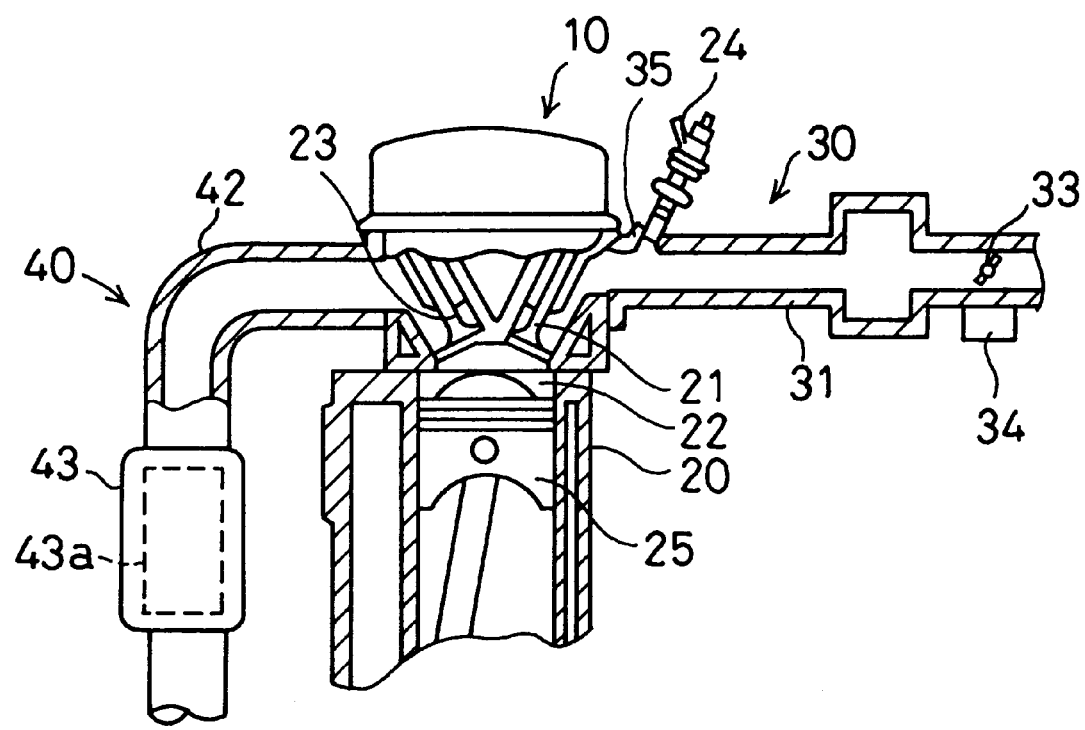
FIG. 3 is a cross sectional view schematically illustrating the engine.

As shown in FIG. 2, which schematically shows the exterior of the engine 10, and FIG. 3 is a cross sectional view schematically illustrating the engine 10. The engine 10 is a gasoline engine driven with gasoline, and includes an intake system 30 arranged before a cylinder 20 and an exhaust system 40 arranged after the cylinder 20. The intake system 30 includes an intake air conduit 31, an air cleaner 32 arranged before the intake air conduit 31, a throttle valve 33 disposed inside the intake air conduit 31, a throttle valve motor 34 for driving on and off the throttle valve 33, and an intake manifold 35 connected after the intake air conduit 31. The intake system 30 is connected to a combustion chamber 22 in the cylinder 20 via an intake valve 21.

The exhaust system 40 includes an exhaust manifold 41 connecting with the cylinder 20 via an exhaust valve 23, an exhaust conduit 42 connected to the exhaust manifold 41, a catalytic converter 43 that is attached to the exhaust conduit 42 and has a catalyst 43a for converting gaseous exhausts, and a muffler 44 disposed after the catalytic converter 43. The catalyst 43a is a three-way catalyst that simultaneously converts hydrocarbons, carbon monoxide, and nitrogen oxides included in the gaseous exhausts and is activated to realize a high conversion ratio in a temperature range of not lower than 350° C.

A reflux conduit 50 is interposed between the intake conduit 31 and the exhaust conduit 42 before the catalytic converter 43, and refluxes the gaseous exhausts flowing through the exhaust conduit 42 to the intake conduit 31. A reflux valve 51, which is a solenoid-operated three-way valve, is attached to a joint of the reflux conduit 50 and the exhaust conduit 42. The reflux valve 51 causes the gaseous exhausts to flow from the exhaust conduit 42 into the catalytic converter 43 in OFF position which the reflux valve 51 is closed, while inhibiting the flow of gaseous exhausts into the catalytic converter 43 and refluxing the flow to the intake conduit 31 in ON position which the reflux valve 51 is opened.

In the engine 10, an air/fuel mixture consisting of the intake air via the intake system 30 and gasoline injected from a fuel injection valve 24 is supplied to the combustion chamber 22, and the motion of a piston 25 pressed down by an explosion of the air/fuel mixture is transformed to rotational motion of the crankshaft. In case that the reflux valve 51 is in OFF position, the gaseous exhausts discharged from the cylinder 20 flow through the exhaust manifold 41 and the exhaust conduit 42, are converted by the catalyst 43a, and are discharged to the atmosphere via the muffler 44. In case that the reflux valve 51 is in ON position, on the other hand, the gaseous exhausts are refluxed to the intake conduit 31.

Figure 4:
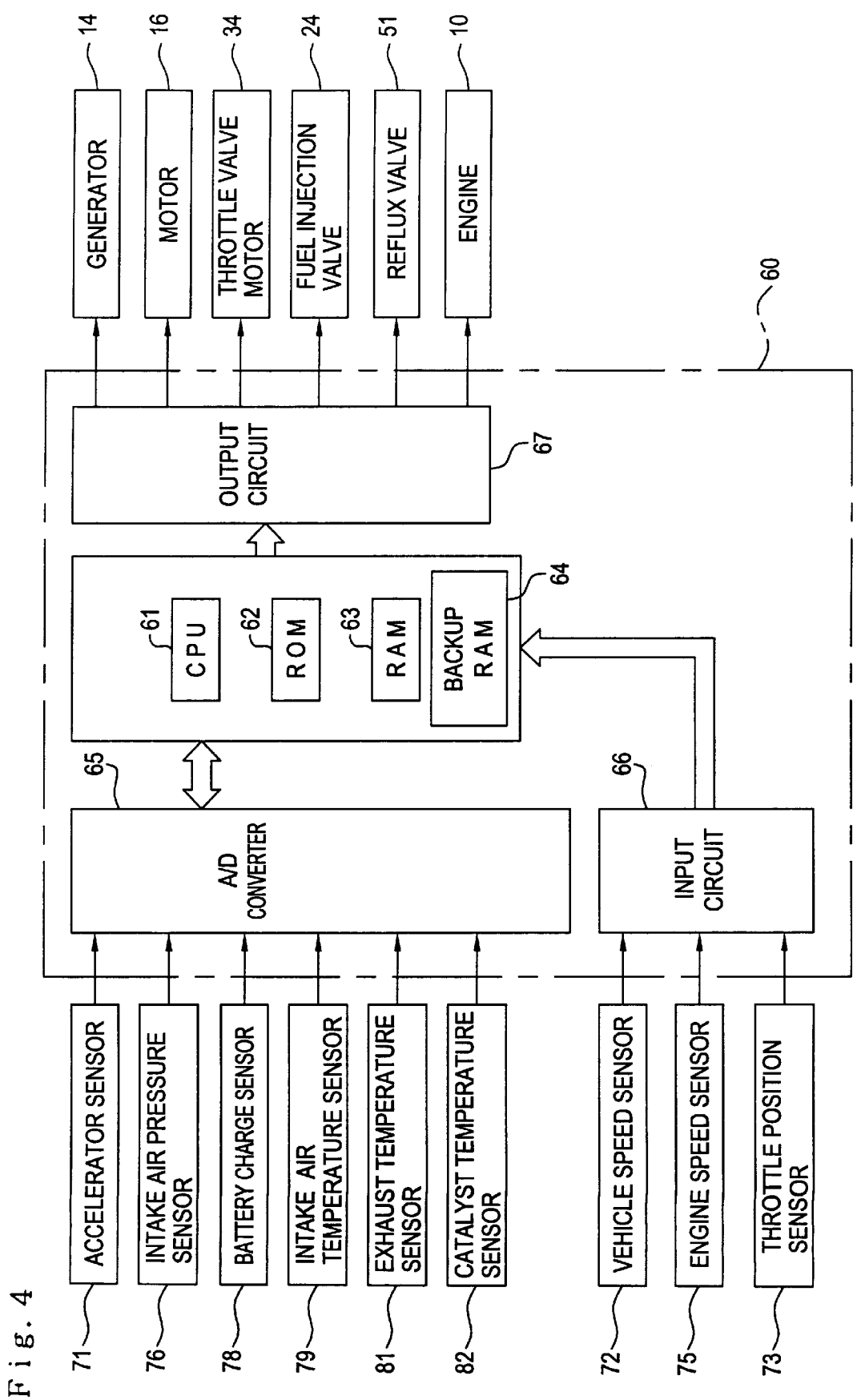
FIG. 4 is a block diagram showing a control system of the hybrid vehicle, which includes a vehicle controller.

Referring back to FIG. 1, a vehicle controller 60 regulates the outputs of the engine 10, the generator 14, and the motor 16. FIG. 4 is a block diagram showing a control system of the hybrid vehicle, which includes the vehicle controller 60.

The vehicle controller 60 is constructed as a logical operation circuit including a microcomputer as shown in FIG. 4. The vehicle controller 60 includes a CPU 61 for executing a variety of operations according to preset control programs, a ROM 62 in which control programs and control data required for the variety of operations by the CPU 61 are stored in advance, a RAM 63 which various data required for the variety of operations by the CPU 61 are temporarily written in and read from, a backup RAM 64 for keeping data in a power-off state, an A/D converter 65 and an input circuit 66 for receiving vehicle information, and an output circuit 67 for outputting driving signals to the generator 14, the motor 16, the throttle valve motor 34 of the engine 10, and actuators including the reflux valve 51 based on the results of operations by the CPU 61.

The vehicle controller 60 reads output signals and data of sensors and switches for detecting various pieces of vehicle information, and carries out the required control. The sensors and switches connected to the vehicle controller 60 include an accelerator sensor 71 for measuring a step-on amount of an accelerator pedal by a driver, a vehicle speed sensor 72 for measuring the vehicle speed, a throttle position sensor 73 for measuring a throttle position of the throttle valve 33, an engine speed sensor 75 for measuring the revolving speed of the engine 10, an intake air pressure sensor 76 for measuring the pressure in the intake conduit 31, and a battery charge sensor 78 for measuring the amount of charge in the battery 19. Other sensors for measuring the temperatures in the engine 10 are also connected to the vehicle controller 60. Such sensors include an intake air temperature sensor 79 for measuring the temperature of the intake air, an exhaust temperature sensor 81 for measuring the temperature of the gaseous exhausts, and a catalyst temperature sensor 82 for measuring the temperature of the catalyst 43*a*. These sensors and switches are electrically connected to the A/D converter 65 and the input circuit 66, so that the vehicle controller 60 can receive the output signals of such sensors and switches.

The following describes the control operations carried out by the vehicle controller 60 thus constructed. The vehicle controller 60 controls the engine 10, the generator 14, and the motor 16 based on the step-on amount of the accelerator pedal and the vehicle speed. In accordance with a concrete procedure, the vehicle controller 60 calculates a required output for the axle based on the step-on amount of the accelerator pedal and the vehicle speed, and adds an amount of charge into the battery 19 to the required output for the axle or alternatively subtracts an amount of discharge from the battery 19 from the required output for the axle, so as to determine a required engine power. The vehicle controller 60 then drives the engine 10 and enables the required engine power to be transmitted directly to the driving wheels 18R and 18L via the planetary gear unit 12. The vehicle controller 60 also supplies the electric power output from the generator 14 to the motor 16 or charges the battery 19 with the electric power.

The vehicle controller 60 carries out a fuel cut control for temporarily cutting a supply of fuel to the engine 10 in an active braking state, so as to improve the fuel consumption rate. In the course of the fuel cut control, the vehicle controller 60 also executes a catalyst warm-up control shown in the flowchart of FIG. 5, in order to prevent the catalyst 43*a* from being cooled down by the low-temperature gaseous exhausts discharged from the engine 10.

Figure 5:
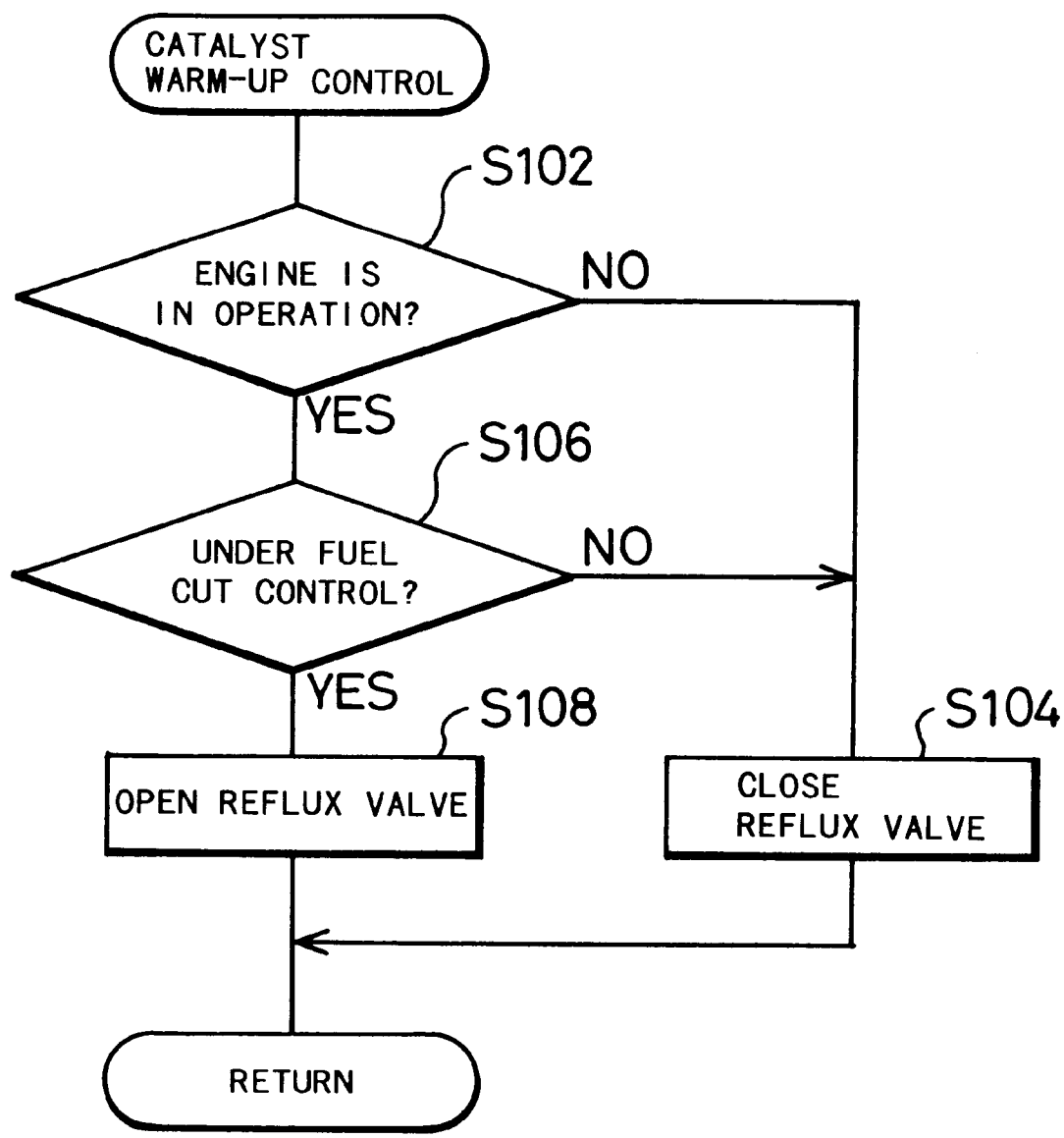
FIG. 5 is a flowchart showing a catalyst warm-up control routine executed in the first embodiment.

FIG. 5 is a flowchart showing a catalyst warm-up control routine executed by the CPU 61 of the vehicle controller 60 in the first embodiment. When the program enters the routine of FIG. 5, it is first determined at step S102 whether or not the engine 10 is in operation. Here it is determined, for example, whether or not the engine 10 is driven at a predetermined or higher revolving speed, based on the detection signal from the engine speed sensor 75. In case that the engine 10 is at a stop, the program proceeds to step S104, at which the reflux valve 51 is kept in the normal OFF position. As discussed previously, the OFF position enables the gaseous exhausts discharged from the engine 10 to be released to the atmosphere.

In case that the engine 10 is in operation at step S102, on the other hand, the program proceeds to step S106, at which it is determined whether or not the fuel cut control is being performed. The determination is based on a flag, which has been set or reset in a separate routine at the time of actuating the brake or at the time of reducing the vehicle speed to a predetermined or lower level. In case that the fuel cut control is not being carried out, the program proceeds to step S104 to set the reflux valve 51 in the OFF position. This enables the gaseous exhausts to be converted by the catalyst 43*a* and released to the atmosphere.

In case that the current state is determined to be in the course of the fuel cut control at step S106, that is, when it is determined that the fuel injection from the fuel injection valve 24 is ceased and the engine 10 is kept in a motoring state, on the other hand, the program proceeds to step S108 to set the reflux valve 51 in the ON position. This enables the gaseous exhausts discharged from the cylinder 20 to pass through the reflux valve 51 and be refluxed to the intake conduit 31, thereby being circulated through the intake conduit 31, the cylinder 20, and the exhaust conduit 42.

Reflux of the gaseous exhausts into the intake conduit 31 in the course of the fuel cut control prevents the gaseous exhausts cooled down by motoring of the engine 10 from flowing into the catalytic converter 43 and cooling down the catalyst 43*a*. The catalyst 43*a* that is kept at high temperatures can thus start conversion of the gaseous exhausts with a high efficiency at the time of resuming the fuel injection.

The structure of the embodiment exerts the greater effects in the hybrid vehicle, compared with in the standard vehicle. On the standard vehicle, the fuel cut control is carried out only for a relatively short time period, for example, at the time of actuating the brake, so that the temperature of the catalyst 43*a* does not generally decrease to the level that lowers the efficiency of conversion. On the hybrid vehicle, on the other hand, the fuel cut control is carried out more frequently, not only at the time of actuating the brake but at the time of driving the vehicle only with the motor 16. The warm-up control of this embodiment, however, effectively prevents the low-temperature gaseous exhausts from cooling down the catalyst 43*a* in the course of the fuel cut control and keeps the catalyst 43*a* at the high temperatures.

The hybrid vehicle can be driven only by the driving force of the motor 16. The output of the engine 10 can thus be set irrespective of the driving force required for driving the vehicle. This enables the engine 10 to be driven in the optimal state with a high fuel consumption efficiency and avoids the control in the state of high revolving speed and heavy loading that increases the amount of gaseous exhausts and worsens the fuel consumption efficiency. The reflux conduit 50 can thus be designed to have a relatively small flow capacity by taking advantage of such characteristics of the hybrid vehicle. This simplifies the structure of the reflux conduit 50.

Reflux of the gaseous exhausts through the reflux conduit 50 has the following secondary effects. In case that the fuel cut control is performed for a relatively long time, for example, at the time of driving on a long down slope, the refluxed gaseous exhausts increase in amount and heat the engine 10 to sufficiently combust the fuel, thereby reducing the occurrence of deposit.

Figure 6:
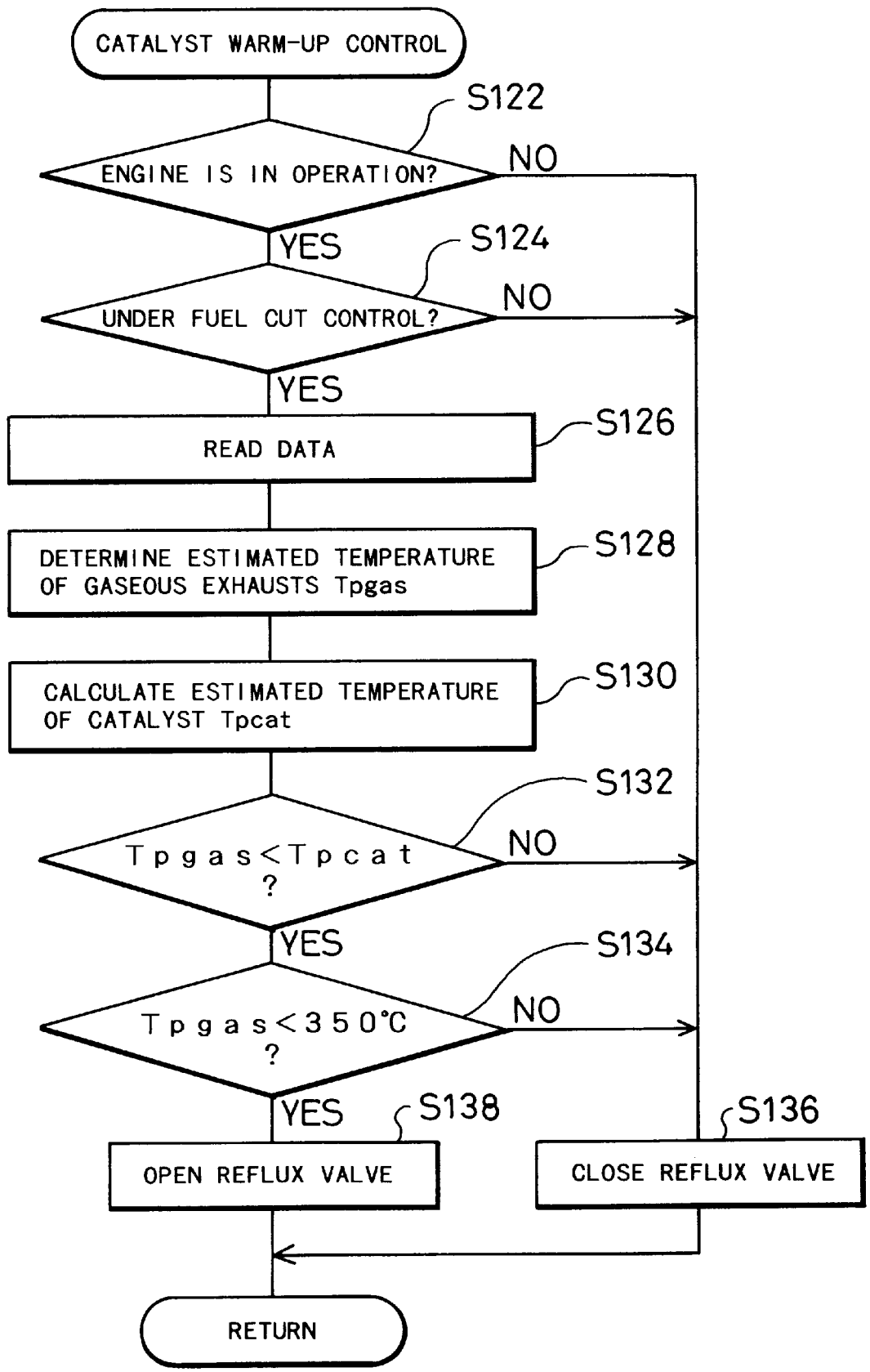
FIG. 6 is a flowchart showing another catalyst warm-up control routine as a second embodiment of the present invention.

FIG. 6 is a flowchart showing another catalyst warm-up control routine as a second embodiment of the present invention. The processing of the second embodiment uses the temperatures of the gaseous exhausts and the catalyst 43a as additional conditions for setting the reflux valve 51 in the OFF position and the ON position.

When it is determined that the engine 10 is driven and falls in a motoring state under the fuel cut control at steps S122 and S124 in the flowchart of FIG. 6, the program executes the processing of steps S126 through S134 to examine the on-off conditions of the reflux valve 51 and eventually select either the ON position or the OFF position of the reflux valve 51. The program first reads data of an engine speed NE, an intake air pressure PM, an intake air temperature THA, and a vehicle speed Vs at step S126.

Figure 7:
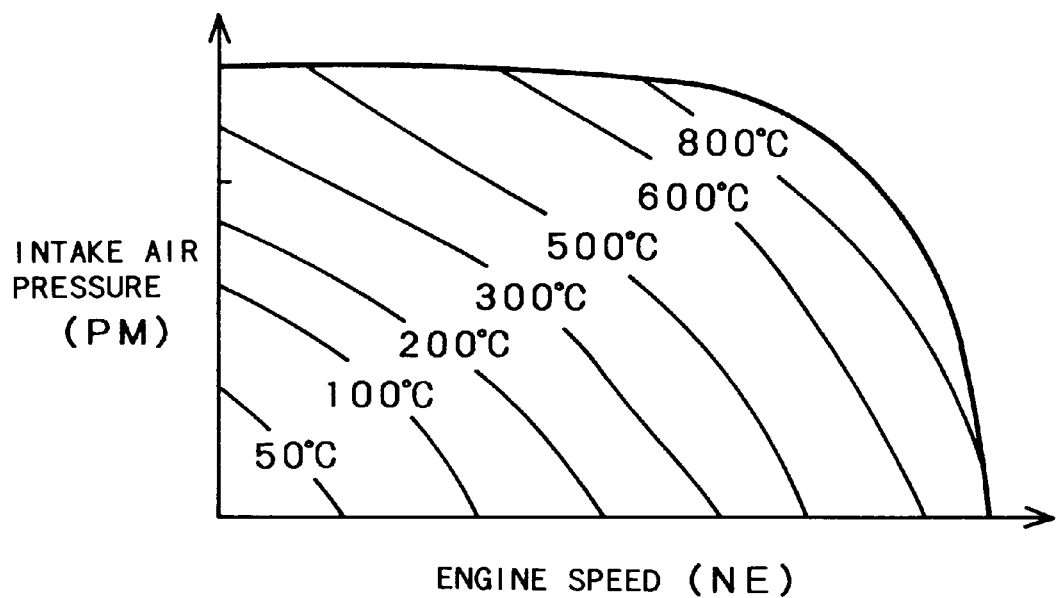
FIG. 7 is a map showing the temperature of gaseous exhausts plotted against the engine speed NE and the intake air pressure PM.

At subsequent step S128, an estimated temperature of gaseous exhausts Tpgas is determined according to the various data input at step S126. The estimated temperature of gaseous exhausts Tpgas is obtained, for example, from the map shown in FIG. 7. FIG. 7 is a map showing the temperature of gaseous exhausts plotted against the engine speed NE and the intake air pressure PM. In accordance with a concrete procedure, at step S128, the temperature of the gaseous exhausts Tpgas corresponding to the engine speed NE and the intake air pressure PM is read from this map.

The program then proceeds to step S130 to calculate an estimated temperature of catalyst Tpcat according to Equation (1) given below:

$$Tpcat = Tpgas + (THA - 25) + K \cdot Vs \qquad (1)$$

Wherein K denotes a constant. The estimated temperature of catalyst Tpcat is obtained by correcting the estimated temperature of gaseous exhausts Tpgas with the cooling effect of the intake air temperature THA, which is represented by the circumferential temperature of the catalytic converter 43, and with the cooling effect of the wind at the vehicle speed Vs.

At step S132, the estimated temperature of gaseous exhausts Tpgas is compared with the estimated temperature of catalyst Tpcat. In case that the estimated temperature of gaseous exhausts Tpgas is not lower than the estimated temperature of catalyst Tpcat, that is, when it is determined that the gaseous exhausts do not have sufficiently low temperatures to cool down the catalyst 43a, the program goes to step S136 to close the reflux valve 51 and thereby enable the gaseous exhausts to be released to the atmosphere.

In case that the estimated temperature of gaseous exhausts Tpgas is lower than the estimated temperature of catalyst Tpcat, on the other hand, the program proceeds to step S134, at which it is determined whether or not the estimated temperature of gaseous exhausts Tpgas exceeds 350° C. In case that the estimated temperature of gaseous exhausts Tpgas is not lower than 350° C. the program goes to step S136 to keep the reflux valve 51 in the OFF position and allow the normal flow of gaseous exhausts. In case that the estimated temperature of gaseous exhausts Tpgas is lower than 350° C. on the contrary, the program goes to step S138 to open the reflux valve 51. This procedure allows reflux of the low-temperature gaseous exhausts to the intake system 30 and thereby prevents the temperature of the catalyst 43a from being lowered.

The processing of the second embodiment estimates the temperatures of the gaseous exhausts and the catalyst 43a based on the driving conditions of the engine 10. When the temperature of the gaseous exhausts decreases to cool down the catalyst 43a to a level that lowers the conversion efficiency of the catalyst 43a, the reflux valve 51 is switched to the ON position, in order to enable the gaseous exhausts to be quickly refluxed to the intake conduit 31. In case that the temperature of the gaseous exhausts is lower than the temperature of the catalyst 43a but is not lower than 350° C. the gaseous exhausts do not cool the catalyst 43a down to the inactive level and are thus flown in the normal direction.

In this embodiment, the temperatures of the gaseous exhausts and the catalyst 43a are estimated according to the engine speed NE and the intake air pressure PM, and no specific sensors are required for measuring the temperatures of the gaseous exhausts and the catalyst 43a. This desirably simplifies the structure of the catalyst temperature control apparatus.

The engine 10 on the hybrid vehicle is driven in a relatively narrow range of driving conditions to realize the high fuel consumption efficiency. In the driving range, neither the load of the engine 10 nor the temperature of the gaseous exhausts varies remarkably. This ensures a high precision of the estimated temperature of catalyst Tpcat and thereby realizes the accurate control.

Figure 8:
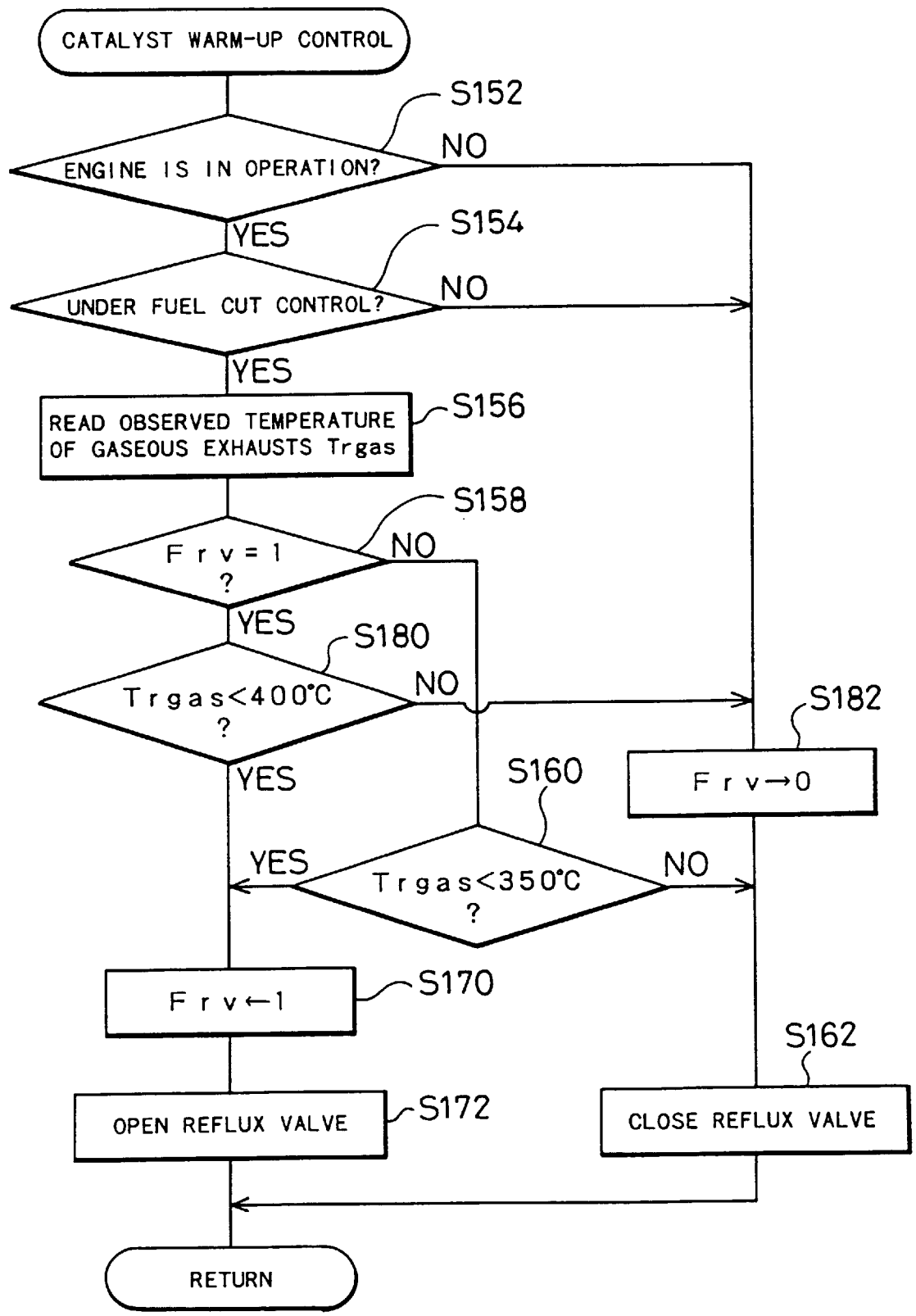
FIG. 8 is a flowchart showing still another catalyst warm-up control routine as a third embodiment of the present invention.

FIG. 8 is a flowchart showing still another catalyst warm-up control routine as a third embodiment of the present invention. The processing of the third embodiment directly measures the temperature of the gaseous exhausts with the exhaust temperature sensor 81 and switches on and off the reflux valve 51 according to the results of measurement, while setting a hysteresis to the temperature condition of the gaseous exhausts for opening and closing the reflux valve 51.

After the determination of the motoring state of the engine 10 at steps S152 and S154 in the flowchart of FIG. 8, an observed temperature of gaseous exhausts Trgas is read from the exhaust temperature sensor 81 at step S156. The program then proceeds to step S158 to read a reflux flag Frv. The reflux flag Frv is reset to "0" in the OFF position of the reflux valve 51 and set to "1" in the ON position of the reflux valve 51. In case that the reflux flag Frv is equal to "0", the program goes to step S160 to determine whether or not the observed temperature of gaseous exhausts Trgas based on the detection signal of the exhaust temperature sensor 81 is lower than 350° C. When the gaseous exhausts have high temperatures of not lower than 350° C., the program proceeds to step S162 to close the reflux valve 51. This allows a normal flow of the gaseous exhausts.

When the observed temperature of gaseous exhausts Trgas read from the exhaust temperature sensor 81 is determined to be lower than 350° C. at step S160, on the other hand, the program proceeds to step S170 to set the reflux flag Frv equal to "1" and subsequently to step S172 to open the reflux valve 51. The program then exists from this routine.

In case that the reflux flag Frv is equal to "1" at step S158, that is, when the reflux valve 51 is in the ON position, the program proceeds to step S180 at which it is determined whether or not the observed temperature of gaseous exhausts Trgas read from the exhaust temperature sensor 81 is lower than 400° C. In case that the observed temperature of gaseous exhausts Trgas reaches or exceeds 400° C., the program goes to step S182 to reset the reflux flag Frv to "0" and subsequently to step S162 to close the reflux valve 51. Namely the reflux valve 51 is opened when the temperature of the gaseous exhausts becomes lower than 350° C., and is closed when the temperature of the gaseous exhausts exceeds 400° C.

The processing of the third embodiment directly reads the observed temperature of gaseous exhausts Trgas from the exhaust temperature sensor 81, and switches on and off the reflux valve 51 based on the results of measurement. This ensures the just enough warm-up control of the catalyst appropriately.

In the structure of the third embodiment, when the observed temperature of gaseous exhausts Trgas read from the exhaust temperature sensor 81 becomes lower than 350° C. (step S160), the reflux valve 51 is opened to reflux the gaseous exhausts to the intake system 30. The reflux valve 51 is kept in the ON position until the observed temperature of gaseous exhausts Trgas reaches or exceeds 400° C. (step S180). The procedure of setting a hysteresis to the temperature condition of the gaseous exhausts for opening and closing the reflux valve 51 effectively prevents the reflux valve 51 from being opened and closed very frequently.

The engine 10 on the hybrid vehicle is not driven under the condition of high revolving speed or heavy loading, so that the temperature of the gaseous exhausts does not rise to an extreme level. A thin thermocouple having a relatively low pressure resistance can be used as the exhaust temperature sensor 81 having a greater response.

The following describes another catalyst warm-up control as a fourth embodiment of the present invention. In addition to the on-off control of the reflux valve 51 discussed above, the structure of the fourth embodiment has a valve timing variable mechanism 90 shown in FIGS. 9 through 11 and sets a longer overlap period, in which an intake valve 21A and an exhaust valve 23A are simultaneously open, so as to prevent an abrupt increase in internal pressure of the reflux conduit 50.

Figure 9:
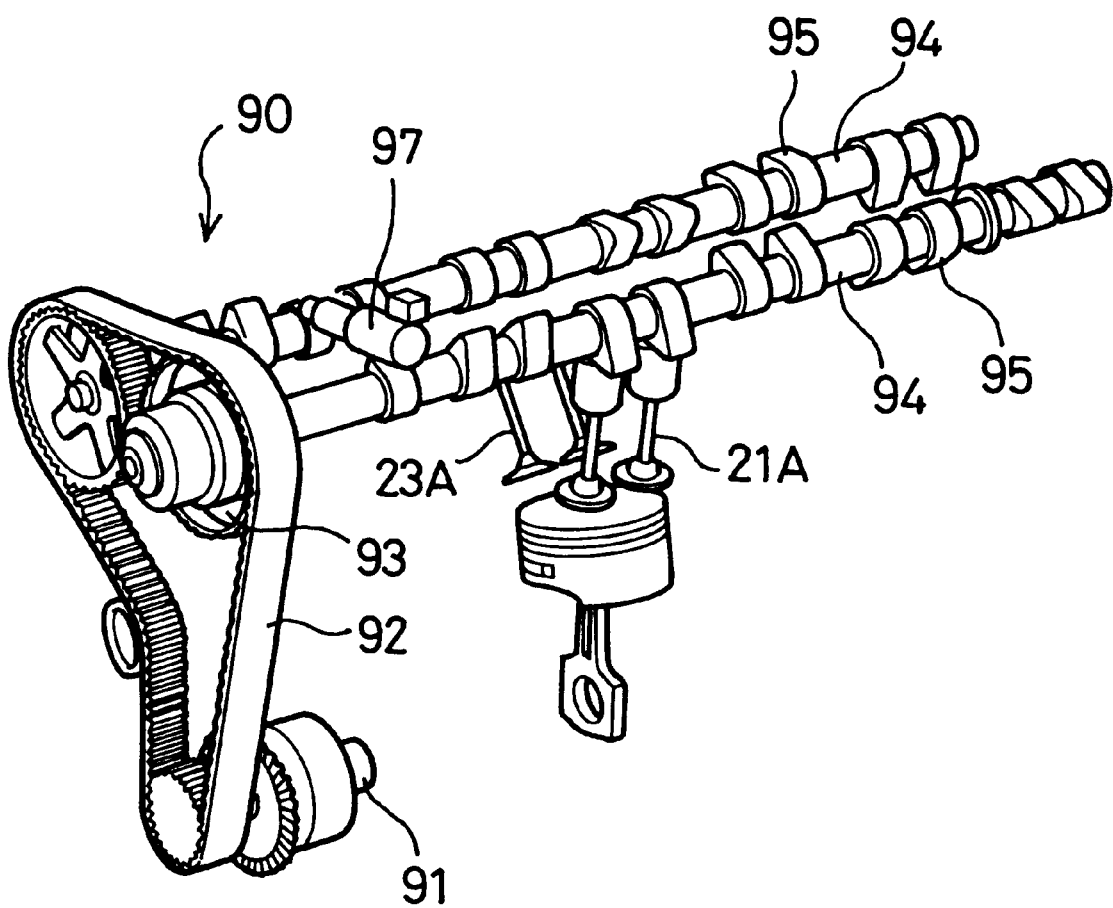
FIG. 9 is a perspective view illustrating a cam mechanism with a valve timing variable mechanism as a fourth embodiment of the present invention.

FIG. 9 is a perspective view illustrating a cam mechanism with the valve timing variable mechanism 90 that can vary the overlap period, in which both the intake valve 21A and the exhaust valve 23A are in ON position. The valve timing variable mechanism 90 is a known device having the functions of enhancing the engine power and improving the conversion efficiency of the gaseous exhausts. Referring to FIG. 9, when a timing belt 92 rotates with rotations of a crankshaft 91 of the engine 10, a cam shaft 94 in linkage with a pulley 93 rotates to give a pressing force to cams 95 and thereby open or close the intake valve 21A and the exhaust valve 23A. A phase shift of the cam shaft 94 to the pulley 93 in the direction of rotation regulates the overlap period of the intake valve 21A and the exhaust valve 23A.

Figure 10:
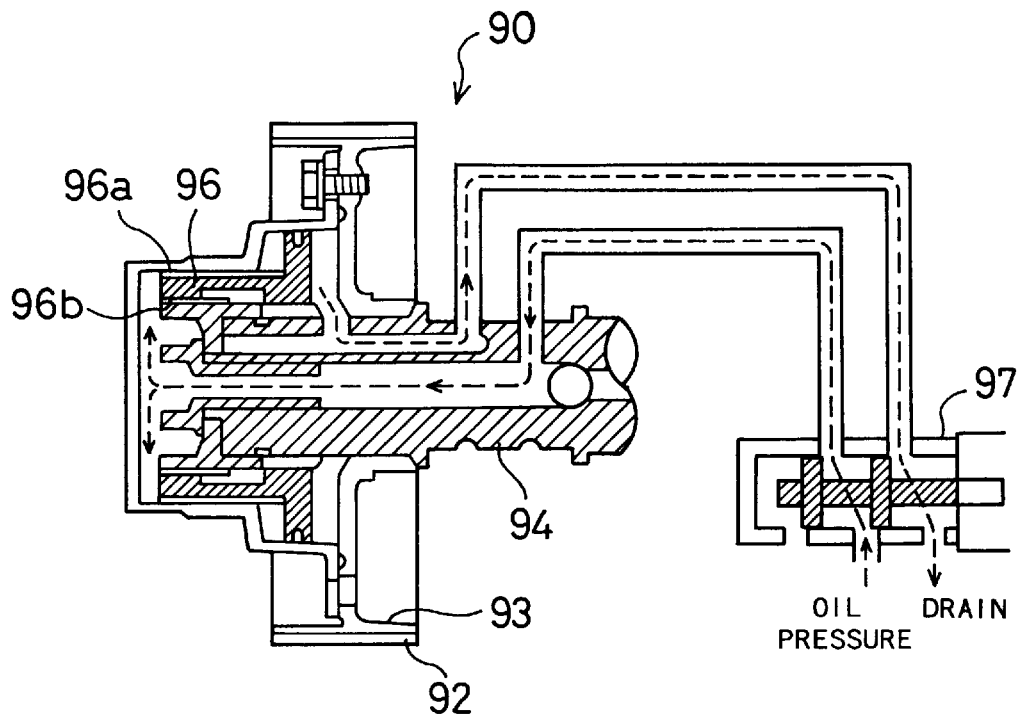
FIG. 10 shows operation of the valve timing variable mechanism.
Figure 11:
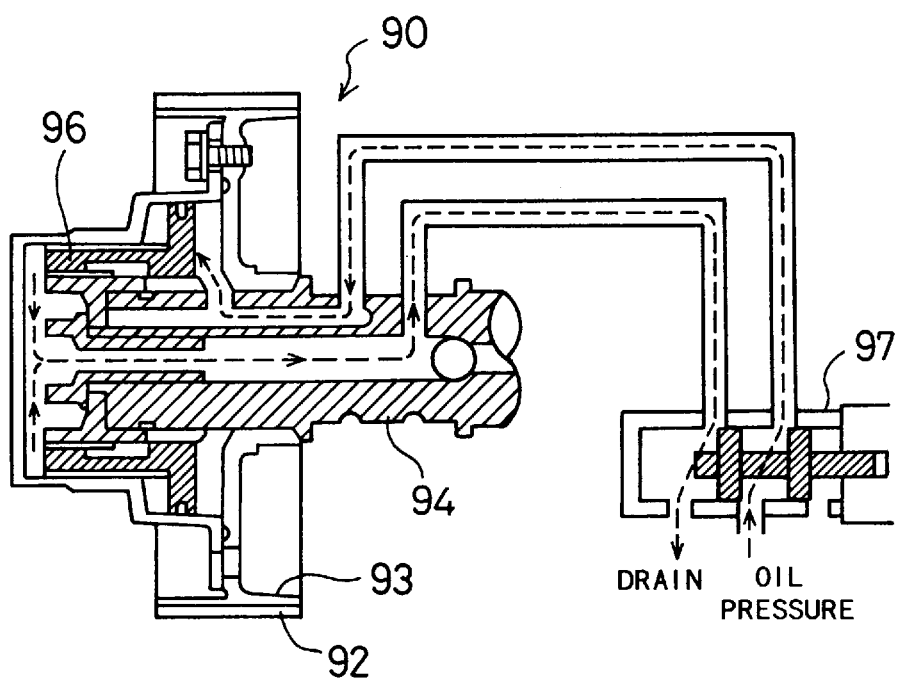
FIG. 11 shows operation of the valve timing variable mechanism.

FIGS. 10 and 11 are axial sectional views schematically illustrating the pulley 93 and the cam shaft 94. The valve timing variable mechanism 90 includes an oil hydraulic piston 96 interposed between the cam shaft 94 and the pulley 93. The oil hydraulic piston 96 has helical splines 96a and 96b on the inner and outer circumferences thereof, and moves along the axis when receiving an oil pressure supplied via a solenoid-operated oil control valve 97. The helical splines 96a and 96b then enable the cam shaft 94 and the pulley 93 to be rotated inversely relative to each other.

An electronic control unit (not shown) gives an instruction to switch the oil control valve 97, in order to increase or decrease the oil pressure and thereby move the oil hydraulic piston 96. When the electronic control unit gives an instruction to set the oil control valve 97 in the position shown in FIG. 10, the oil pressure flows along the arrows of FIG. 10 and moves the oil hydraulic piston 96 from left to right in the drawing. The distortion of the helical splines 96a and 96b formed on the oil hydraulic piston 96 moves the cam shaft 94 relative to the pulley 93 by a phase lead. When the electronic control unit gives an instruction to set the oil control valve 97 in the position shown in FIG. 11, on the other hand, the oil pressure flows along the arrows of FIG. 11 and moves the oil hydraulic piston 96 from right to left in the drawing. This enables the cam shaft 94 to move by a phase delay. In case that the oil control valve 97 blocks the oil path, the oil hydraulic piston 96 is kept in the current position. The regulated oil pressure with the oil control valve 97 enables the cam shaft 94 and the pulley 93 to rotate relative to each other via the oil hydraulic piston 96 by a phase lead or a phase delay, thereby changing the overlap period.

Figure 12:
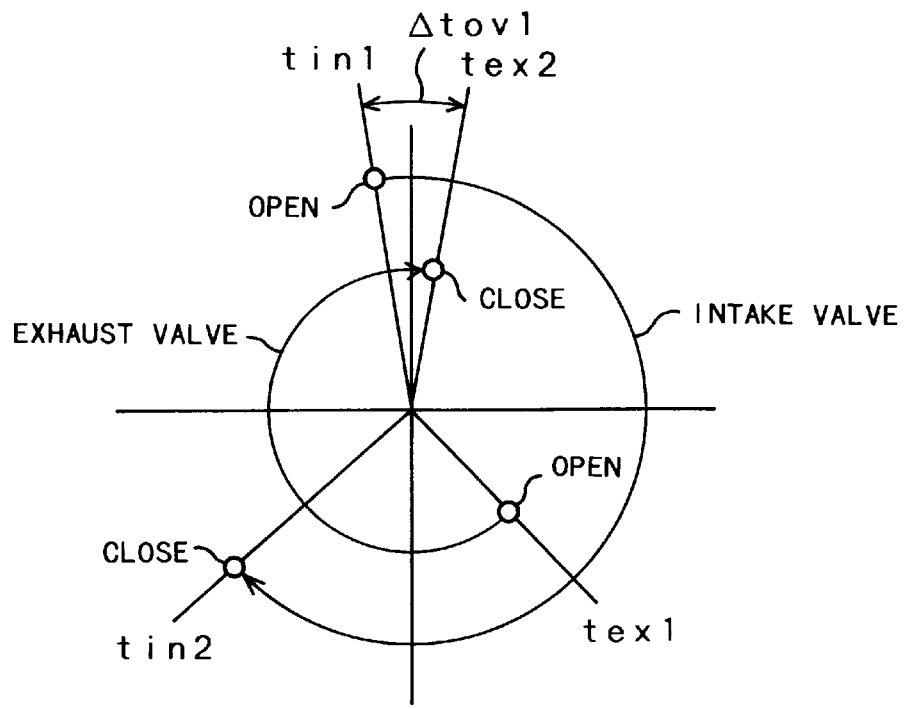
FIG. 12 shows opening and closing timing of the intake valve and the exhaust valve in the valve timing variable mechanism.
Figure 13:
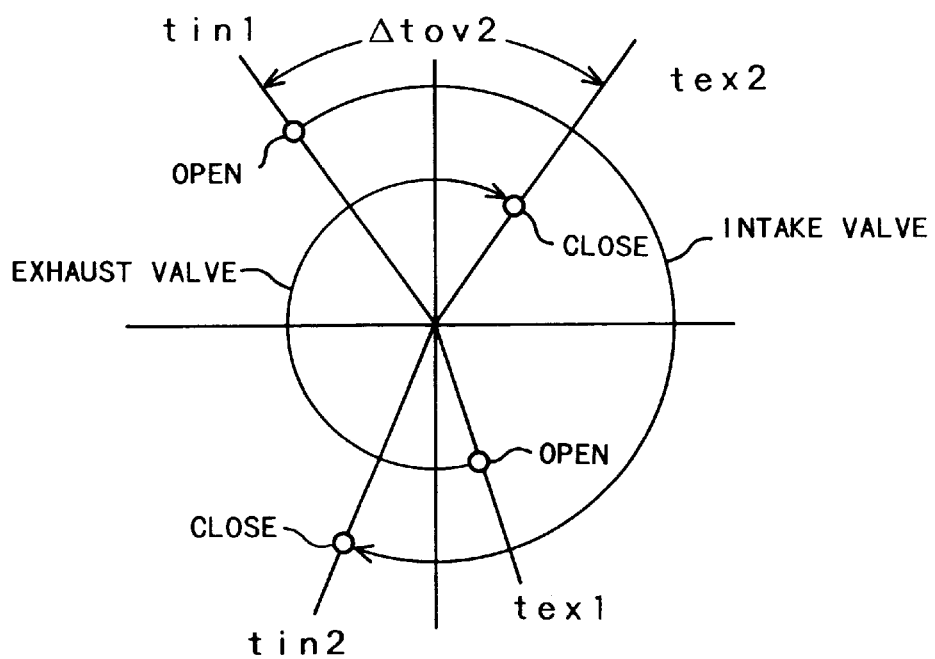
FIG. 13 shows the state of a longer overlap period than the overlap period of FIG. 12.

FIGS. 12 and 13 respectively show the opening and closing timing of the intake valve 21A and the exhaust valve 23A in the valve timing variable mechanism 90. FIG. 12 shows the state of a normal overlap period, whereas FIG. 13 shows the state of a longer overlap period. In the drawings of FIGS. 12 and 13, the intake valve 21A opens at a time point tin1 and closes at a time point tin2. The exhaust valve 23A, on the other hand, opens at a time point tex1 and closes at a time point tex2. Here $\Delta$tov1 and $\Delta$tov2 represent overlap periods. This embodiment carries out a control to lengthen the overlap period $\Delta$tov1 shown in FIG. 12 to the overlap period $\Delta$tov2 shown in FIG. 13.

Figure 14:
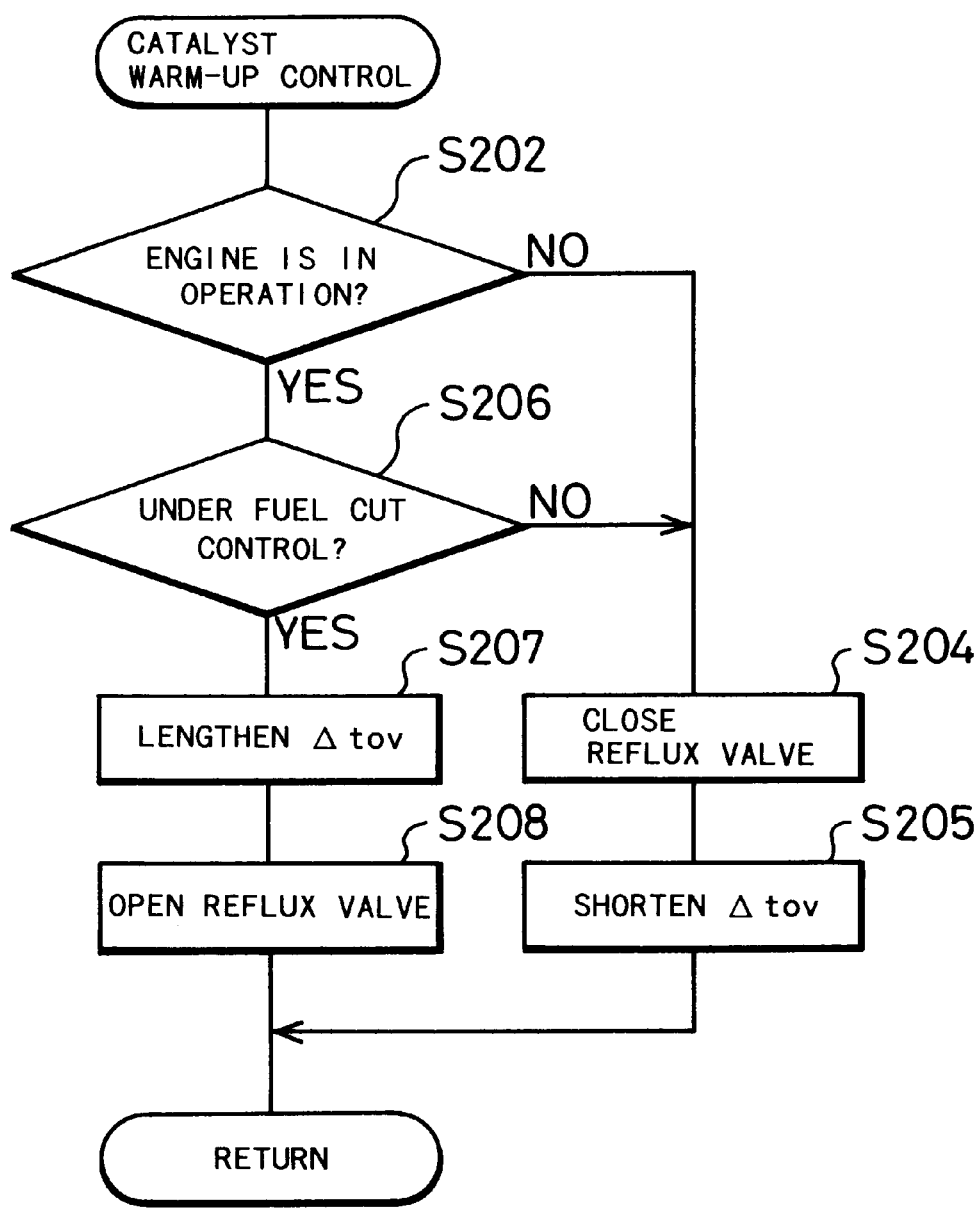
FIG. 14 is a flowchart showing a catalyst warm-up control routine carried out in the fourth embodiment.

The warm-up control of the fourth embodiment including the control of the valve timing variable mechanism 90 follows the flowchart of FIG. 14. In case that the motoring state of the engine 10 (see FIG. 2) is determined at steps S202 and S206 in the flowchart of FIG. 14, the program proceeds to step S207 to lengthen the overlap period by the valve timing variable mechanism 90 and further to step S208 to open the reflux valve 51 (see FIG. 2). In case that the motoring state of the engine 10 is cancelled, on the other hand, the program proceeds to step S204 to close the reflux valve 51 and further to step S205 to return the overlap period to the original state.

The procedure of lengthening the overlap period by the valve timing variable mechanism 90 simultaneously with the opening operation of the reflux valve 51 shortens the period in which the cylinder 20 is sealed and thereby reduces a pressure variation in the cylinder 20. The reduced pressure variation in the cylinder 20 decreases a pressure variation in the exhaust conduit 42, thus preventing the pressure applied to the reflux valve 51 and the reflux conduit 50 from abruptly increasing. This does not require the enhanced mechanical strength of the reflux conduit 50 and the reflux valve 51 and simplifies the structure.

A modified application of the catalyst warm-up control of FIG. 14 opens the reflux valve 51 when a predetermined time period (for example, 20 ms) has elapsed since the process of lengthening the overlap period by the valve timing variable mechanism 90 under the motoring state of the engine 10. This modified application also returns the overlap period to the original state when a predetermined time period (for example, 20 ms) has elapsed since the closing operation of the reflux valve 51 under the cancellation of the motoring state. This modification, which sets a certain time period between the opening or closing operation of the reflux valve 51 and the variation of the overlap period, further reduces the pressure variation in the engine 10 and effectively protects the reflux valve 51 and the reflux conduit 50 from the pressure shock.

The following describes another warm-up control as a fifth embodiment of the present invention. The fifth embodiment temporarily increases the engine power to heighten the temperature of gaseous exhausts and raise the temperature of the catalyst by the hot gaseous exhausts. This process is carried out whenever the temperature of the catalyst decreases, irrespective of the fuel cut control of the engine 10.

Figure 15:
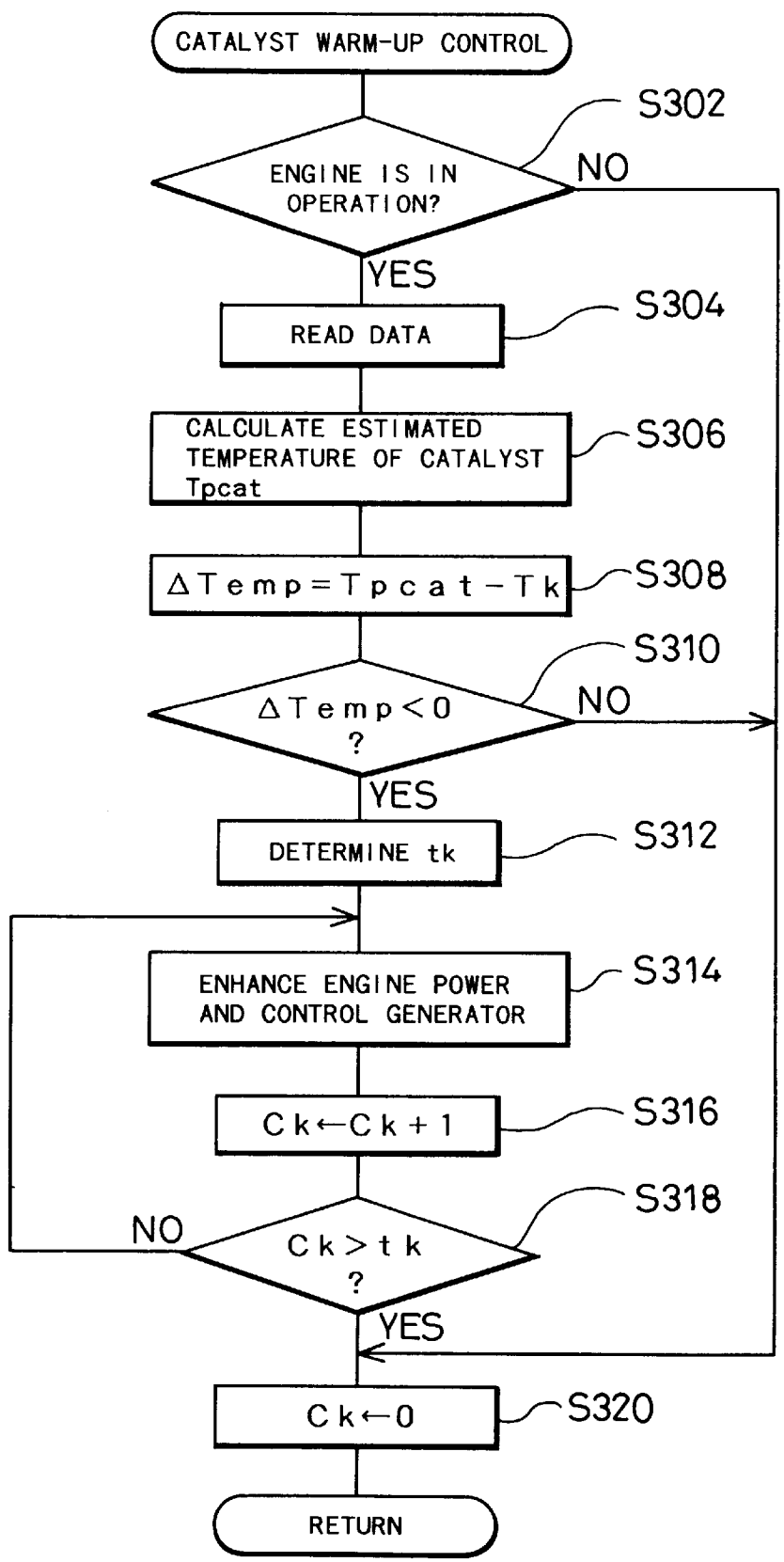
FIG. 15 is a flowchart showing another catalyst warm-up control routine as a fifth embodiment of the present invention.

The procedure of the fifth embodiment follows the flowchart of FIG. 15. When it is determined that the engine 10 is in operation at step S302, the program proceeds to step S304 to read data of the engine speed NE, the intake air pressure PM, and the intake air temperature THA. At subsequent step S306, in the same manner as the processing of step S130 in the flowchart of FIG. 6, the estimated temperature of catalyst Tpcat is calculated from the data input at step S304.

Figure 16:
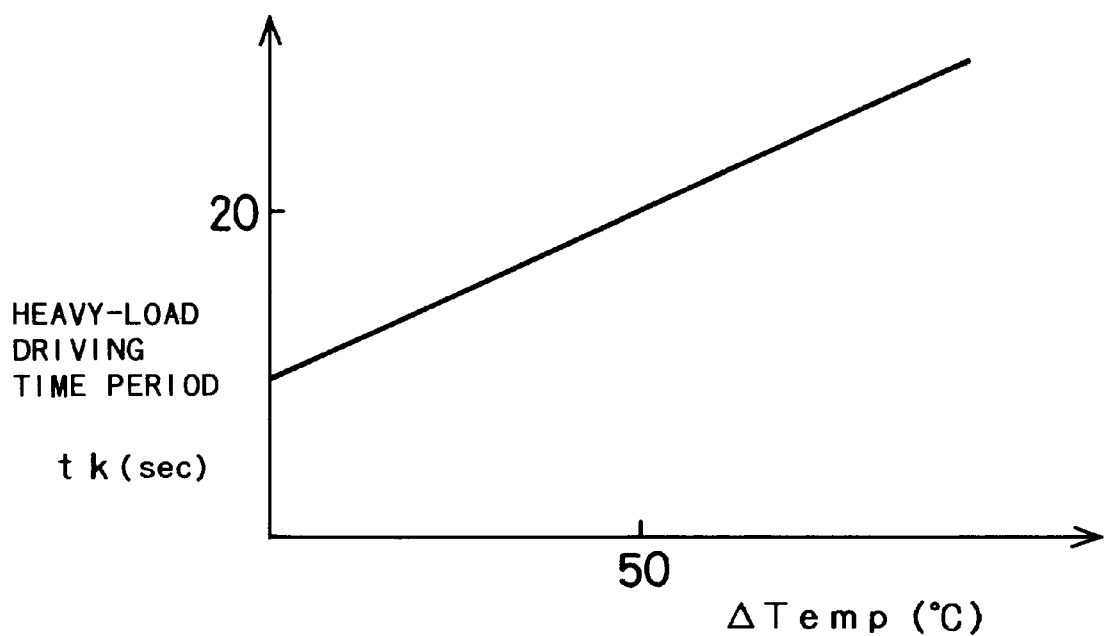
FIG. 16 is a graph showing the relationship between the temperature difference and the heavy-load driving time period.

The program then proceeds to step S308, at which a temperature difference ΔTemp is calculated by subtracting a catalyst activating temperature Tk from the estimated temperature of catalyst Tpcat. The catalyst activating temperature Tk represents a temperature required for activating the catalyst 43a (for example, 350° C.). When the temperature difference ΔTemp has a negative value at step S310, that is, when the estimated temperature of catalyst Tpcat is lower than the catalyst activating temperature Tk and the warm-up control of the catalyst 43a is required, the program proceeds to step S312. At step S312, a heavy-load driving time period tk, for which the power of the engine 10 is temporarily enhanced, is determined according to the temperature difference ΔTemp in the graph of FIG. 16. The heavy-load driving time period tk is plotted as ordinate and the temperature difference ΔTemp as abscissa in the graph of FIG. 16.

At subsequent step S314, an engine power EP is enhanced for the heavy-load driving time period tk obtained at step S312. In order to keep the engine speed NE at a substantially constant level, the electric loading of the generator 14 is raised to absorb an increase in engine torque ET due to the enhanced engine power EP. The battery 19 is charged with the energy corresponding to the increase in electric loading of the generator 14. The program then proceeds to step S316 to increment a temperature increase counter Ck and further to step S318 to compare the count on the temperature increase counter Ck with the heavy-load driving time period tk. In case that the count on the temperature increase counter Ck exceeds the heavy-load driving time period tk at step S318, the program goes to step S320 to clear the temperature increase counter Ck to "0" and exits from this routine.

Figure 17:
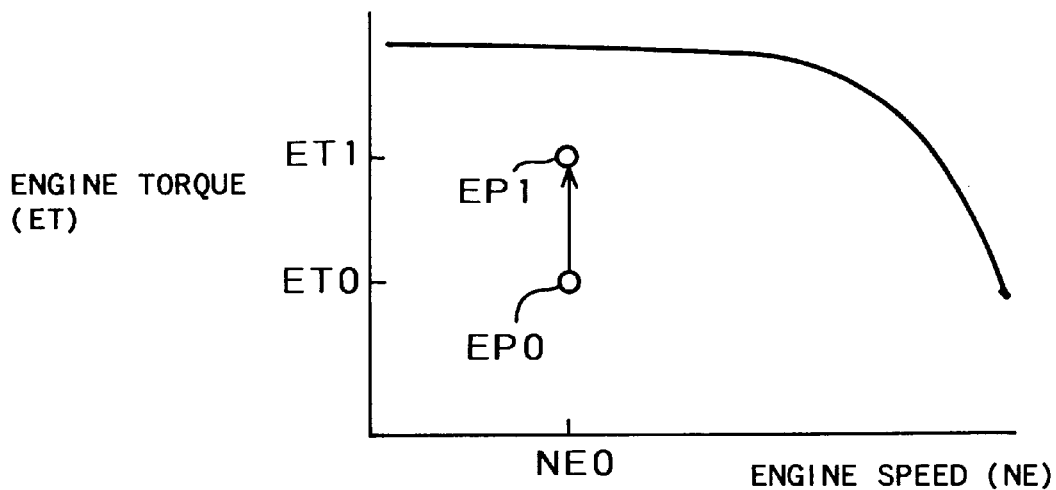
FIG. 17 is a graph showing the relationship between the engine speed and the engine torque in the fifth embodiment.
Figure 18:
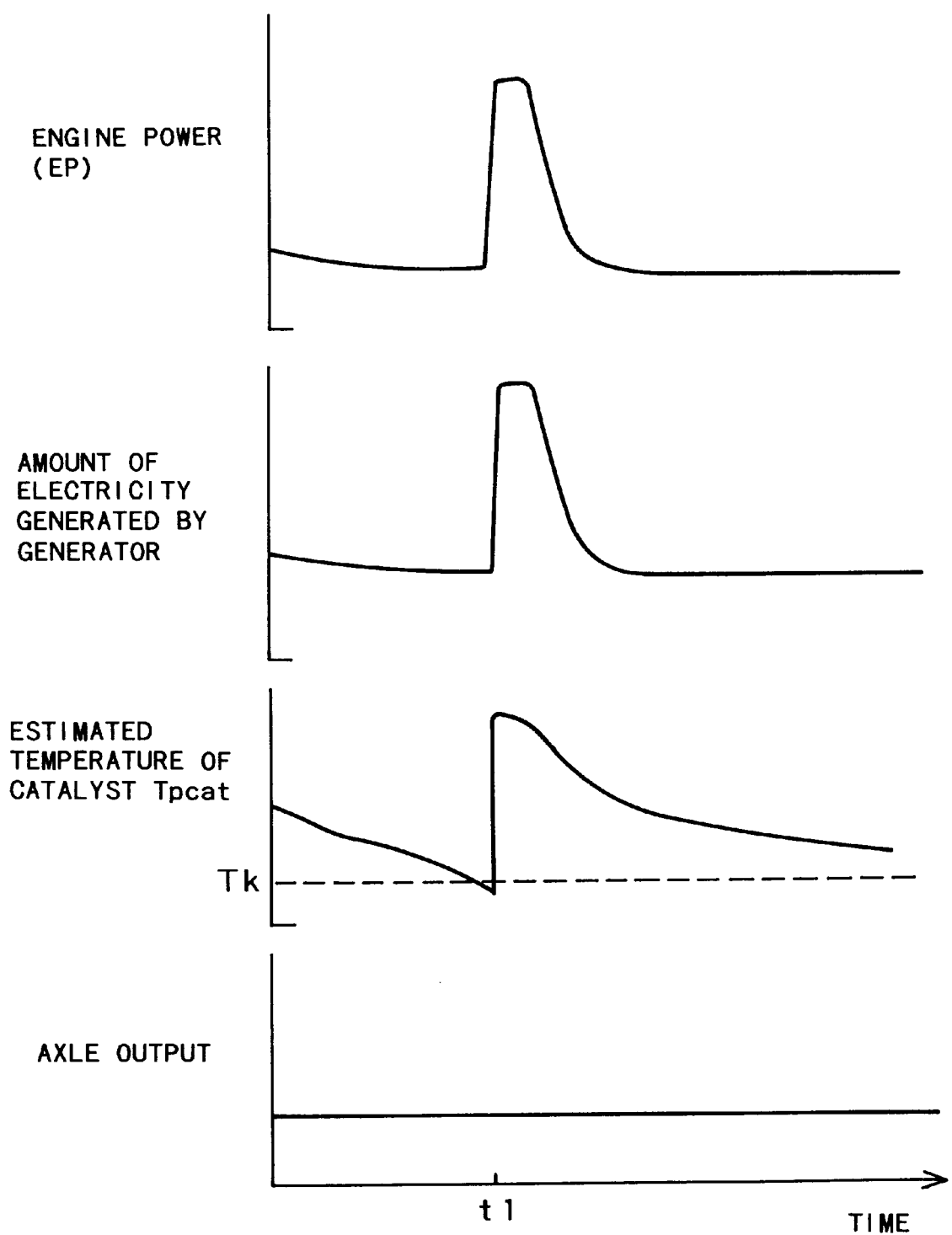
FIG. 18 is a timing chart showing the engine power and other related data when the engine speed is kept at a constant level.

FIG. 17 is a graph showing the relationship between the engine speed NE and the engine torque ET. FIG. 18 is a timing chart when the engine power EP is increased from EP0 to EP1 while the engine speed NE is kept constant at NE0 as shown in FIG. 17. In case that the estimated temperature of catalyst Tpcat becomes lower than the catalyst activating temperature Tk at a time point t1 in the timing chart of FIG. 18, the engine power EP is enhanced while the engine speed NE is kept constant at NE0. The enhanced engine power EP raises the temperature of the gaseous exhausts and thereby increases the temperature of the catalyst 43a.

In case that the temperature of the catalyst 43a is lowered, the structure of the fifth embodiment temporarily enhances the engine power EP and enables the hot gaseous exhausts to be flown to the catalyst 43a, thereby raising the temperature of the catalyst 43a quickly.

This embodiment warms up the catalyst 43a by an increase in engine power EP. The energy corresponding to the increase in engine power EP is stored into the battery 19 through the generation of the generator 14. This ensures the high energy efficiency. The energy corresponding to the increase in engine power EP is absorbed by the generation of the generator 14 and does not temporarily vary the axle output transmitted to the wheels, thus preventing a decrease in drivability. The engine speed NE is kept constant while the engine power EP is enhanced. This prevents an increase in engine noise.

The structure of the embodiment only increases the engine power EP to raise the temperature of the catalyst 43a and does not require any mechanical change of the engine.

Figure 19:
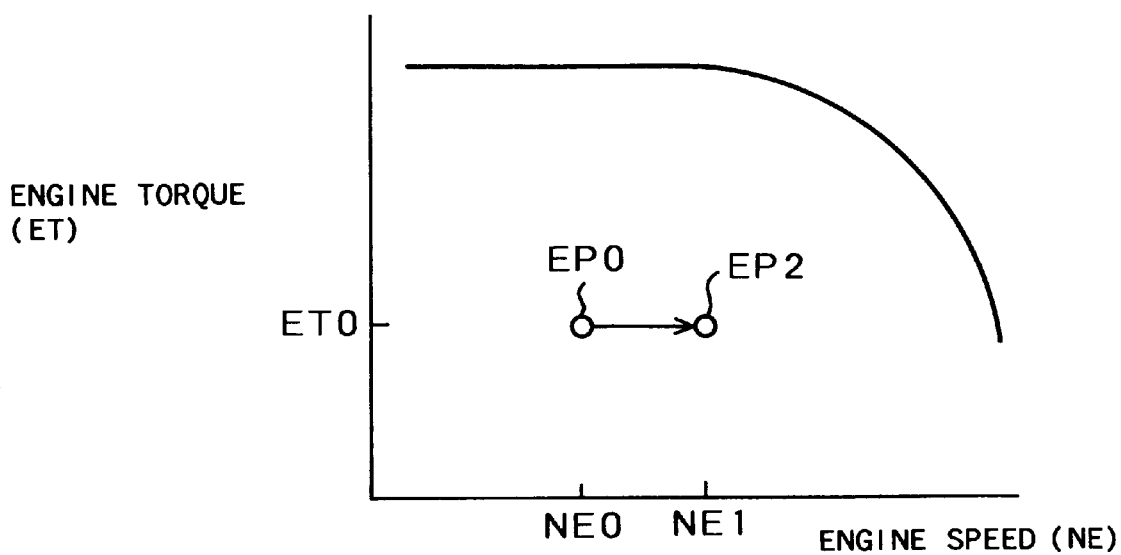
FIG. 19 is a graph showing the relationship between the engine speed and the engine torque in a sixth embodiment according to the present invention.

In the catalyst warm-up control discussed with the flowchart of FIG. 15, in order to raise the temperature of the catalyst, the engine power EP is enhanced while the engine speed NE is kept at a substantially constant level. Another possible control procedure increases the engine power EP from EP0 to EP2 while the engine torque ET is kept at a substantially constant level as shown in FIG. 19. Namely the engine speed NE is raised from NE0 to NE1 while the engine torque ET is kept constant at ET0 in the graph of FIG. 19. In this case, the generator 14 generates electricity at a higher efficiency when the engine 10 is driven at a higher revolving speed. The generator 14 generates electricity to rapidly charge the battery 19, especially when the battery 19 has a small remaining charge.

Figure 20:
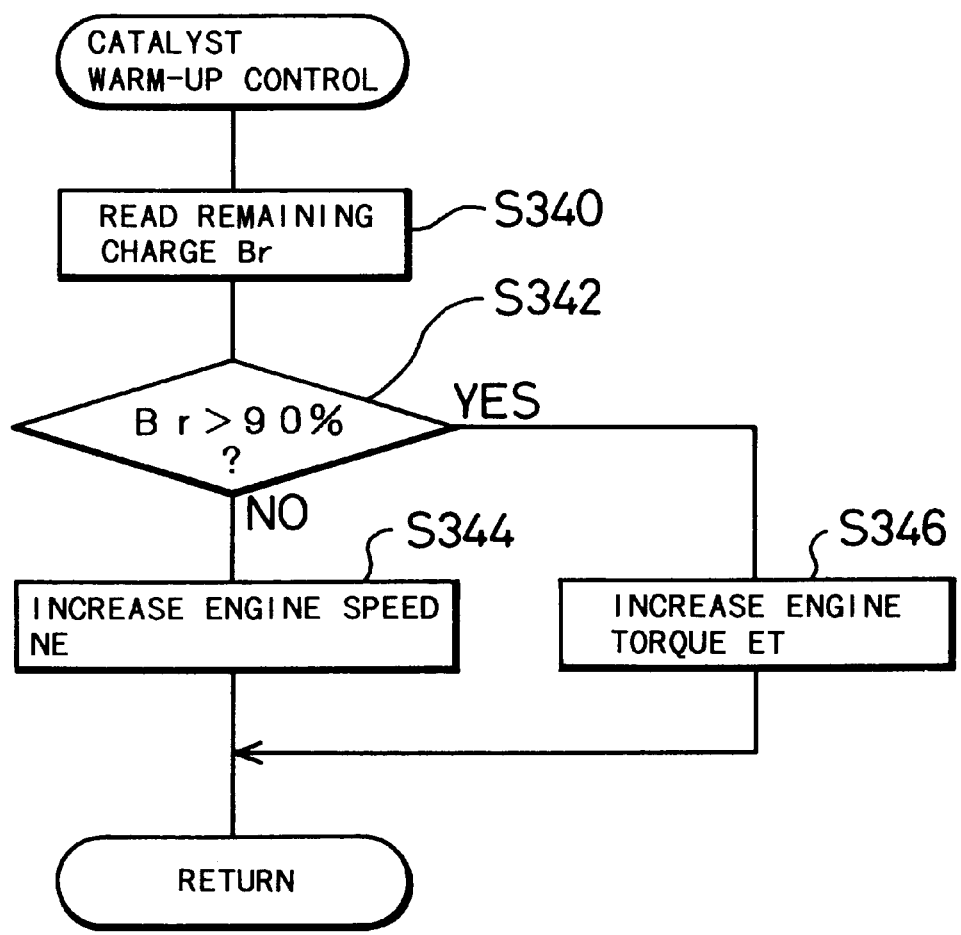
FIG. 20 is a flowchart showing another catalyst warm-up control routine as a seventh embodiment of the present invention.

In addition to the procedure of enhancing the engine power EP under the condition of a constant engine speed NE as shown in FIGS. 15 through 18 or the procedure of enhancing the engine power EP under the condition of a constant engine torque ET as shown in FIG. 19, the catalyst warm-up control may depend upon a remaining charge Br of the battery 19 as shown in the flowchart of FIG. 20. In a seventh embodiment of the present invention, the processing of step S314 in the flowchart of FIG. 15 is replaced by the processing of steps S340 through S346 in the flowchart of FIG. 20. When entering the routine of FIG. 20, the program reads the remaining charge Br based on a detection signal of the battery charge sensor 78 at step S340. In case that the remaining charge Br is determined to be less than 90% at step S342, the control is carried out at step S344 to increase the engine speed NE accompanied by the enhanced engine power EP. In case that the remaining charge Br is determined to be not less than 90% at step S342, on the contrary, the control is carried out at step S346 to increase the engine torque ET accompanied by the enhanced engine power EP.

When the battery 19 has a large remaining charge Br, the control of the seventh embodiment does not increase the engine speed NE, thereby keeping the engine noise at a low level. When the battery 19 has a small remaining charge Br, on the other hand, the control increases the engine speed NE, thereby enabling the battery 19 to be charged with a high efficiency.

Figure 21:
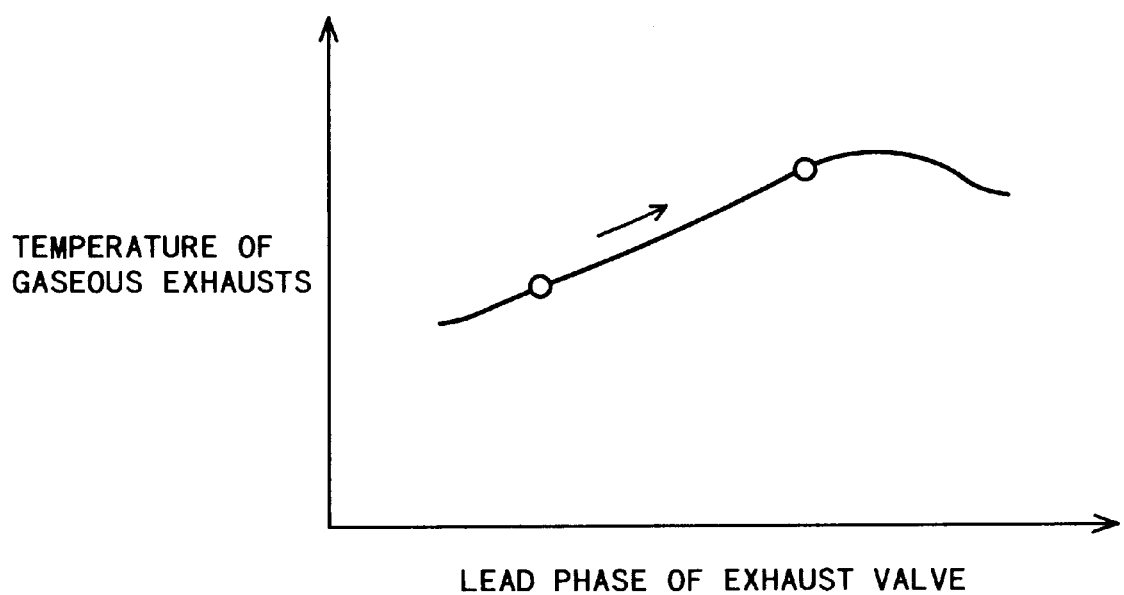
FIG. 21 is a graph showing the relationship between the lead phase of the opening timing of the exhaust valve and the temperature of the gaseous exhausts.

The catalyst warm-up control may adopt the valve timing variable mechanism 90 discussed above with the drawings of FIGS. 9 through 11, in order to vary the engine power. FIG. 21 is a graph showing the relationship between the lead phase of the exhaust valve in the valve timing variable mechanism 90 and the temperature of the gaseous exhausts. The lead phase of the exhaust valve, that is, the earlier opening timing of the exhaust valve, enables the gaseous exhausts to include a large amount of non-combusted gas and to be combusted in the vicinity of the catalyst, thereby raising the temperature of the catalyst.

Figure 22:
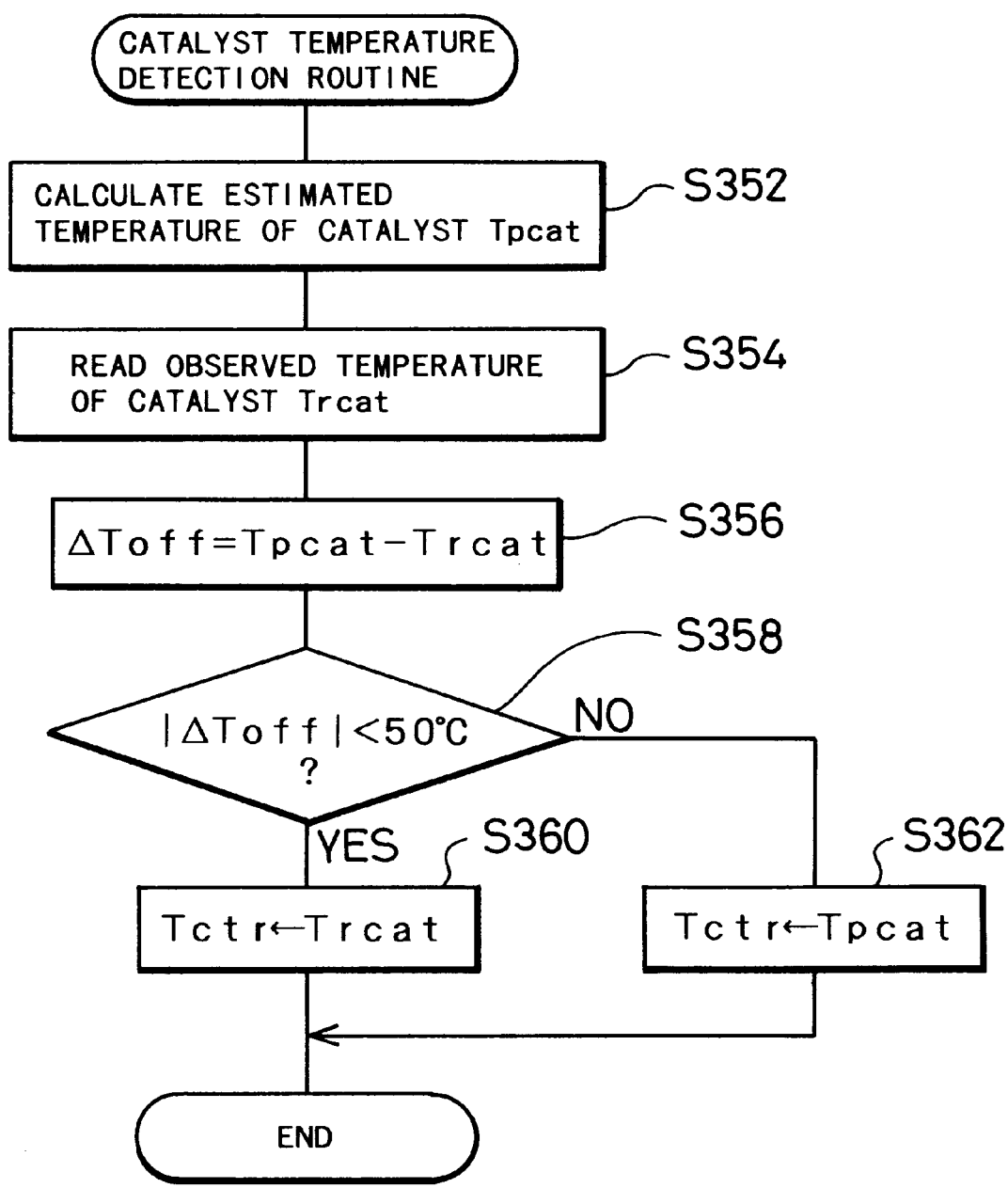
FIG. 22 is a flowchart showing a catalyst temperature detection routine.

FIG. 22 is a flowchart showing a catalyst temperature detection routine. This routine represents a back-up control that utilizes the measurement of a catalyst temperature sensor and switches to the estimated temperature of catalyst (discussed above) when the catalyst temperature sensor outputs an abnormal signal due to a malfunction or time-based change. After reading the variety of data, the program enters the routine of FIG. 22. The program first calculates the estimated temperature of catalyst Tpcat at step S352, and reads an observed temperature of catalyst Trcat based on the detection signal output from the catalyst temperature sensor at step S354. The estimated temperature of catalyst Tpcat is calculated from the detection signals of the various sensors in the same manner as the processing of step S130 in the flowchart of FIG. 6.

A temperature difference ΔToff is calculated at step S356 by subtracting the observed temperature of catalyst Trcat from the estimated temperature of catalyst Tpcat. When the temperature difference ΔToff does not exceed a predetermined value ±50° C. at step S358, the observed temperature of catalyst Trcat is set to a catalyst control temperature Tctr at step S360. When the temperature difference ΔToff exceeds the predetermined value, on the other hand, the estimated temperature of catalyst Tpcat is set to the catalyst control temperature Tctr at step S362. The catalyst warm-up control routine of steps S310 through S320 in the flowchart of FIG. 15 is then carried out at the catalyst control temperature Tctr thus determined.

Even when the catalyst temperature sensor malfunctions and the observed temperature of catalyst Trcat based on the detection signal output from the catalyst temperature sensor is deviated from the real temperature of the catalyst, this procedure enables the catalyst warm-up control to be continuously executed.

Figure 23:
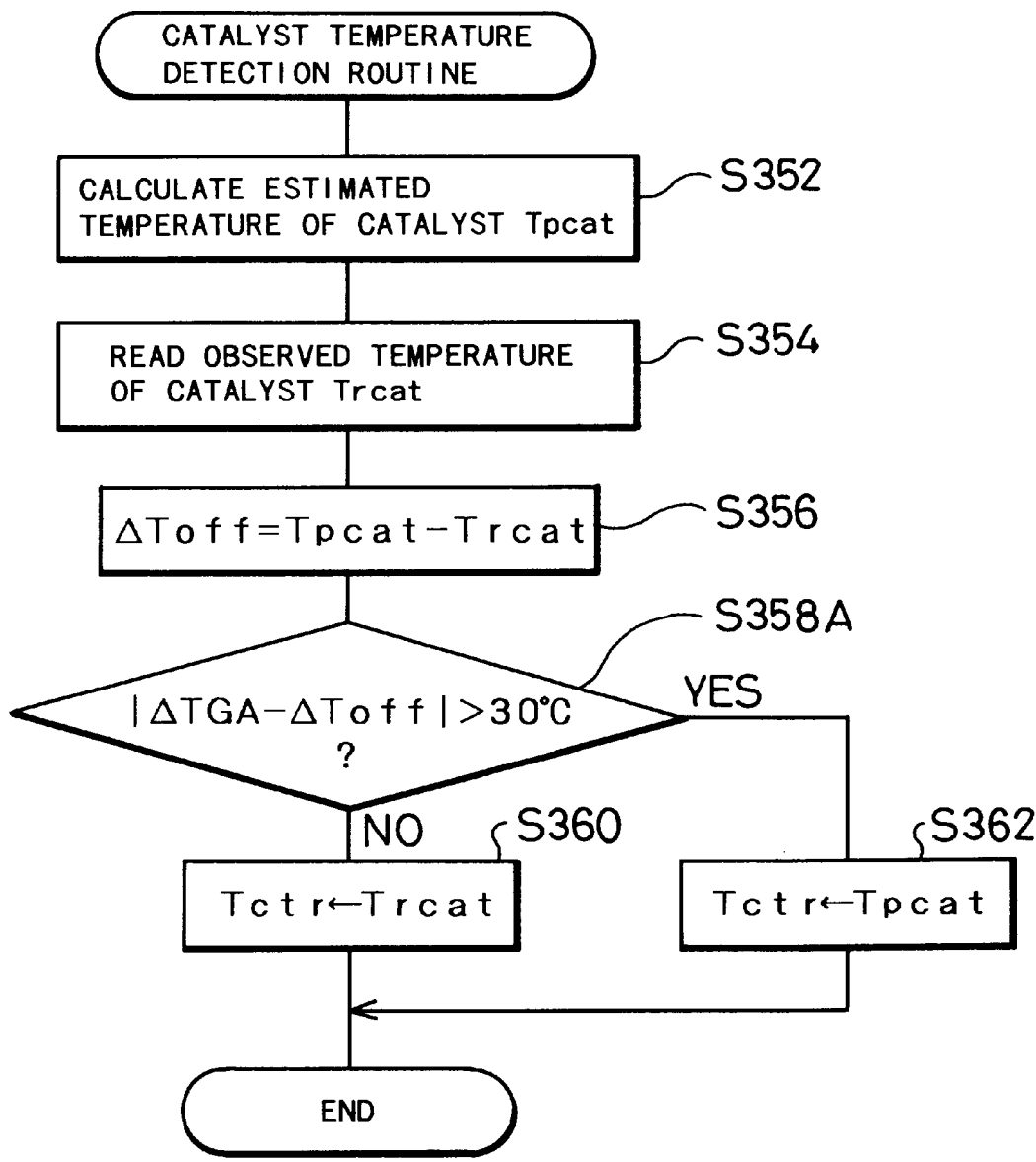
FIG. 23 is a flowchart showing another catalyst temperature detection routine.

The catalyst temperature detection routine of FIG. 22 determines whether or not the temperature difference ΔToff exceeds the range of ±50° C. As shown in the flowchart of FIG. 23, another catalyst temperature detection routine utilizes a leaned value ΔTGA obtained by learning the difference between the estimated temperature of catalyst Tpcat and the observed temperature of catalyst Trcat. In the routine of FIG. 23, it is determined at step S358A whether or not the difference between the learned value ΔTGA and the temperature difference ΔToff exceeds 30° C. When the difference does not exceed the range of ±30° C., the observed temperature of catalyst Trcat is set to the catalyst control temperature Tctr at step S360. When the difference exceeds the range of ±30° C., on the other hand, the estimated temperature of catalyst Tpcat is set to the catalyst control temperature Tctr at step S362.

Figure 24:
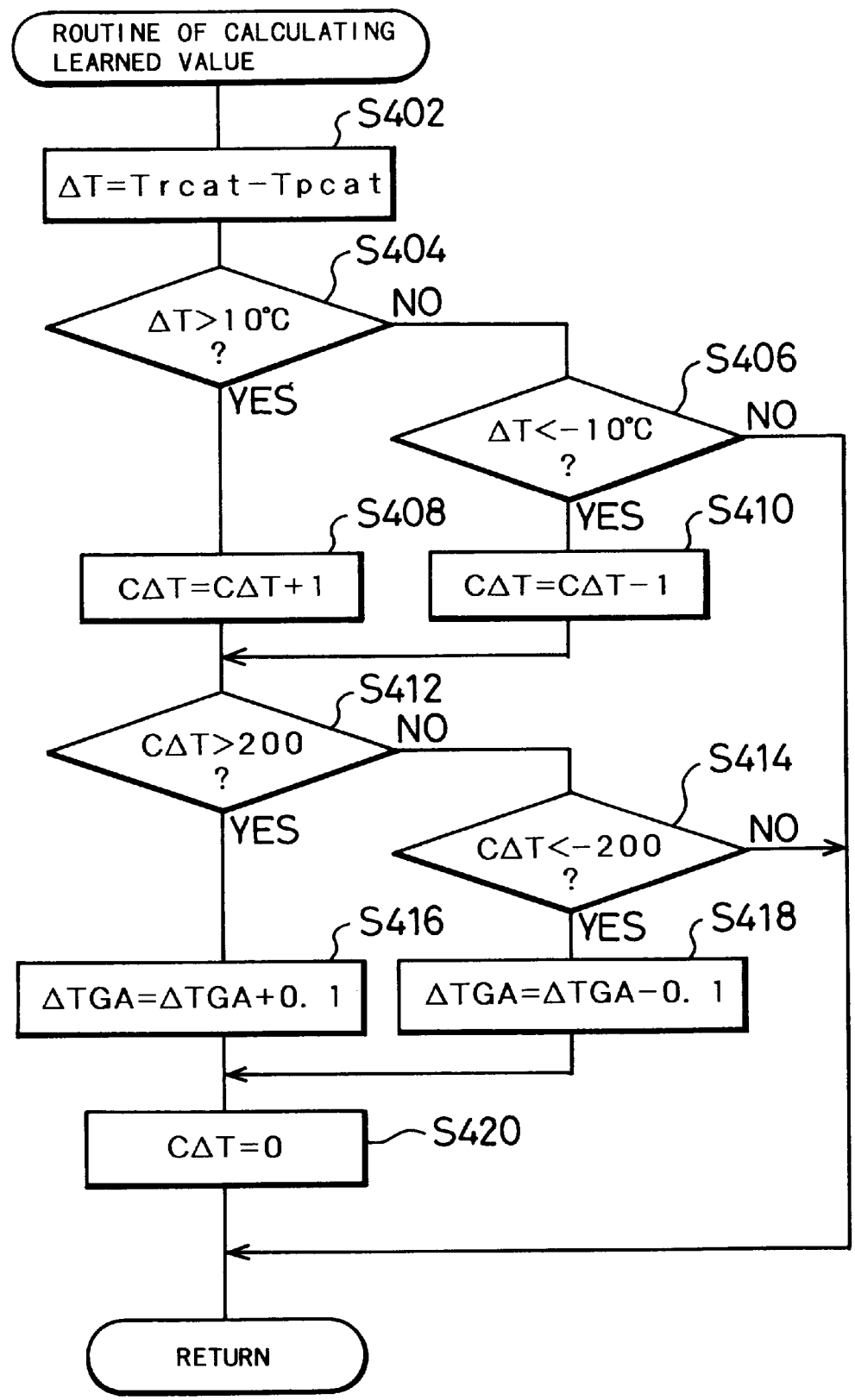
FIG. 24 is a flowchart showing a routine of calculating a learned value of the temperature difference used in the catalyst temperature detection routine.

The learned value ΔTGA used at step S358A in the flowchart of FIG. 23 is set to zero at an initial starting time of the vehicle and updated by the flowchart of FIG. 24. When the program enters the routine of FIG. 24, a temperature difference ΔT is calculated at step S402 by subtracting the estimated temperature of catalyst Tpcat from the observed temperature of catalyst Trcat. The temperature difference ΔT is then compared with the values 10° C. and −10° C. at steps S404 and S406, respectively. When the temperature difference ΔT is determined to be greater than 10° C. at step S404, the program proceeds to step S408 to add +1 to CΔT (C: constant). When the temperature difference ΔT is determined to be less than −10° C. at step S406, on the other hand, the program proceeds to step S410 to add −1 to CΔT.

At subsequent steps S412 and S414, CΔT is compared respectively with the values 200 and −200. In case that CΔT is determined to be greater than the value 200 at step S412, the program proceeds to step S416 to add 0.1 to the learned value ΔTGA. In case that CΔT is determined to be less than the value −200 at step S414, on the other hand, the program proceeds to step S418 to add −0.1 to the learned value ΔTGA. At subsequent step S420, CΔT is cleared to zero.

Figure 25A:
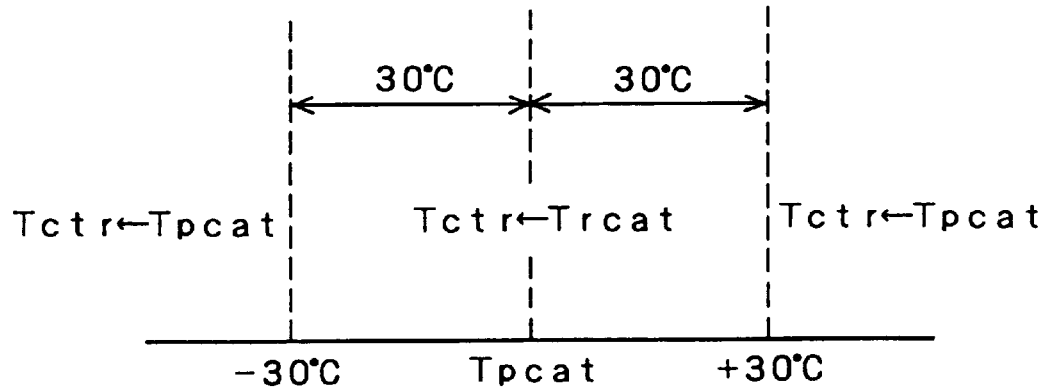
FIG. 25 shows the procedure of calculating the learned value of FIG. 24.
Figure 25B:
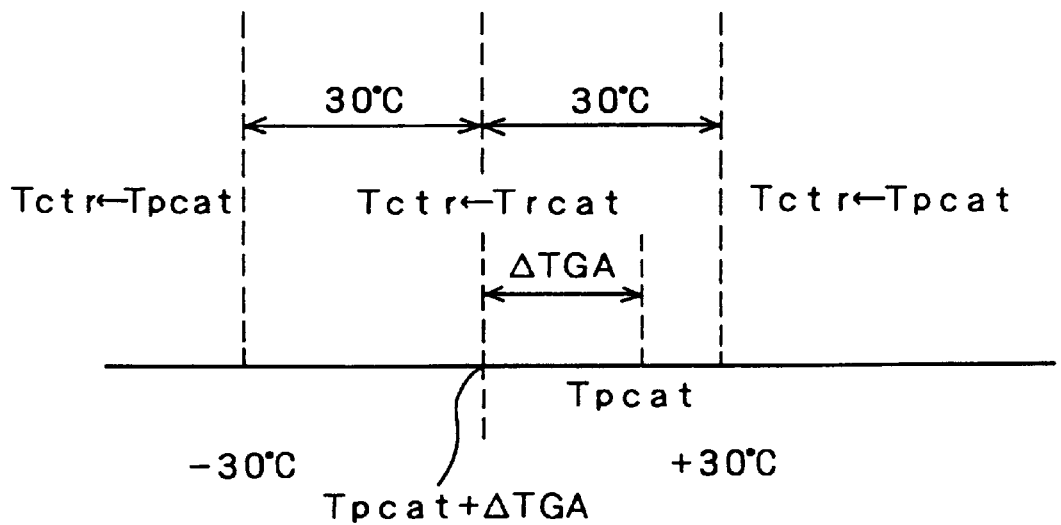

The concrete procedure of FIGS. 23 and 24 is described with the drawings of FIGS. 25A and FIG. 25B. In the state of FIG. 25(A), in case that the observed temperature of catalyst Trcat does not exceed the range of ±30° C. around the estimated temperature of catalyst Tpcat, the observed temperature of catalyst Trcat is set to the catalyst control temperature Tctr. In case that the observed temperature of catalyst Trcat exceeds the range of ±30° C., on the other hand, the estimated temperature of catalyst Tpcat is set to the catalyst control temperature Tctr. In the state of FIG. 25B when the time-based change increases the learned value ΔTGA, in case that the observed temperature of catalyst Trcat does not exceed the range of ±30° C. around the sum of the learned value ΔTGA and the estimated temperature of catalyst Tpcat, the observed temperature of catalyst Trcat is set to the catalyst control temperature Tctr. In case that the observed temperature of catalyst Trcat exceeds the range of ±30° C., on the other hand, the estimated temperature of catalyst Tpcat is set to the catalyst control temperature Tctr. Even when the accumulated deposit on the catalyst temperature sensor varies the observed temperature of catalyst Trcat, this procedure takes into account the value obtained by learning the observed temperature of catalyst Trcat and appropriately selects either one of the observed temperature of catalyst Trcat and the estimated temperature of catalyst Tpcat. This accordingly realizes the favorable catalyst warm-up control corresponding to the time-based change of the catalyst temperature sensor.

Figure 26:
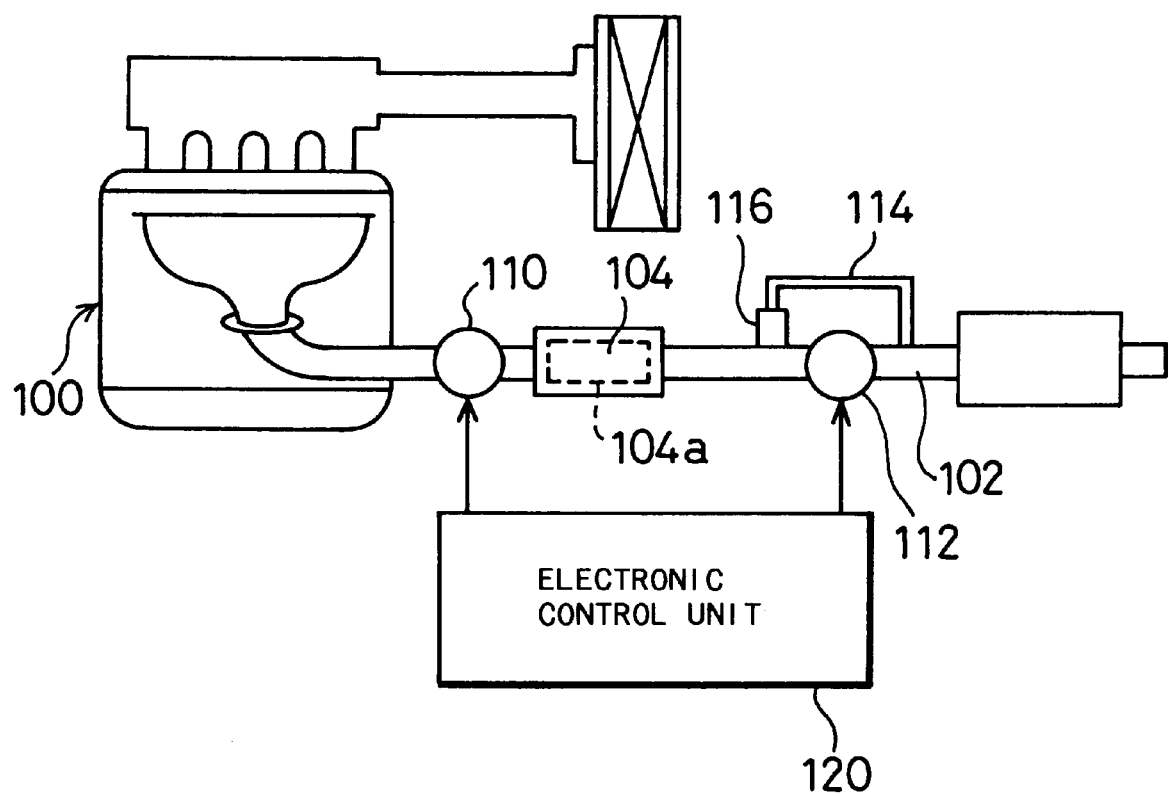
FIG. 26 schematically illustrates structure of another engine mounted on a hybrid vehicle as an eighth embodiment of the present invention.
Figure 27:
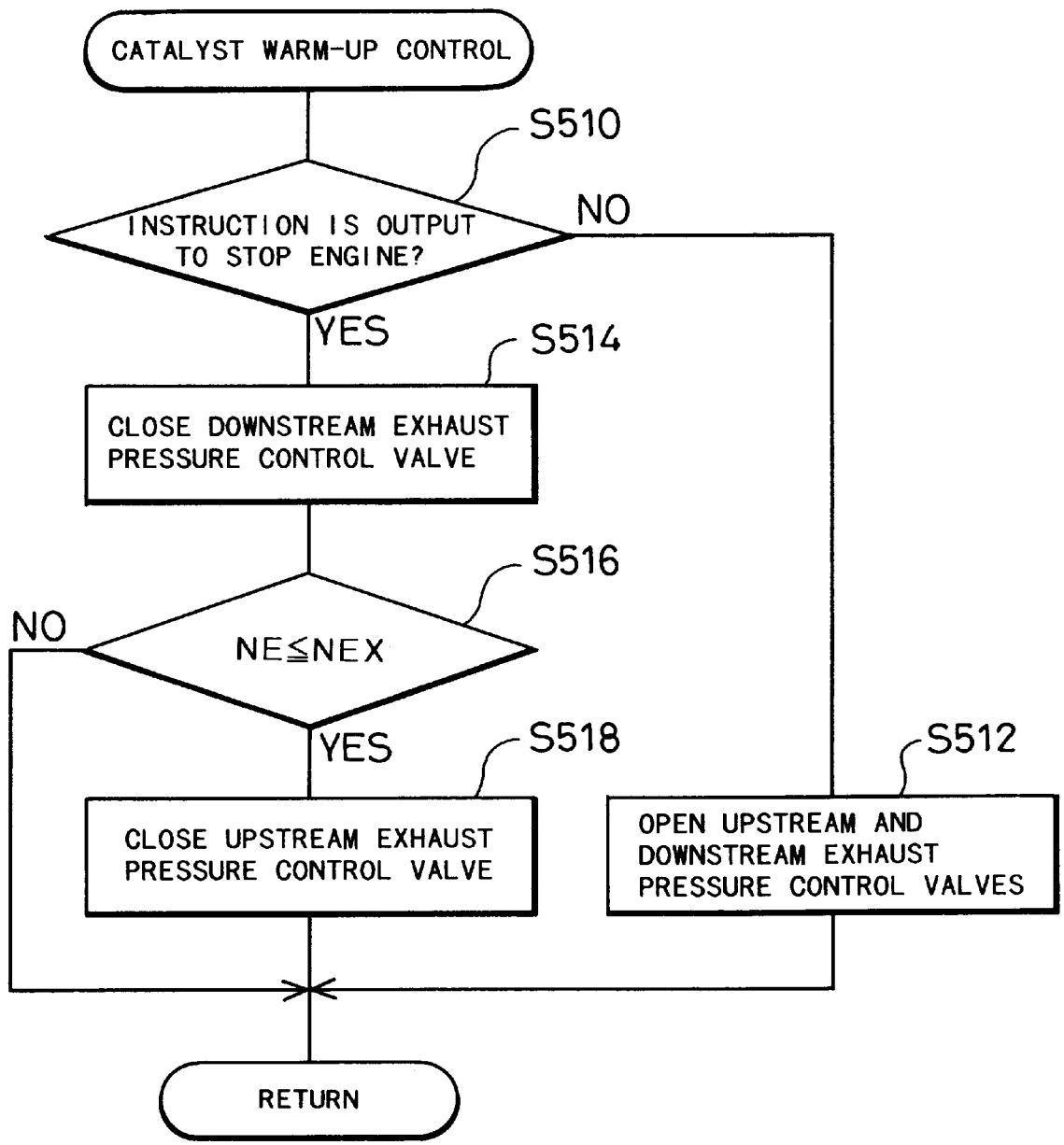
FIG. 27 is a flowchart showing a catalyst warm-up control routine carried out in the eighth embodiment.

FIGS. 26 and 27 show an eighth embodiment according to the present invention, which seals the atmosphere surrounding the catalyst by the hot gaseous exhausts and keeps the catalyst warm, thereby preventing the catalyst from being cooled down to or below the catalyst activating temperature.

FIG. 26 schematically illustrates structure of an engine 100. Referring to FIG. 26, an upstream exhaust pressure control valve 110 and a downstream exhaust pressure control valve 112 are disposed respectively before and after a catalyst 104a in an exhaust conduit 102 of the engine 100. A bypass conduit 114 for bypassing the downstream exhaust pressure control valve 112 is connected to the exhaust conduit 102, and a bypass valve 116 is attached to the bypass conduit 114. The upstream exhaust pressure control valve 110 and the downstream exhaust pressure control valve 112 are constructed as solenoid-operated valves and turned open and close by an electronic control unit 120. The bypass valve 116 is a release valve that is generally set in a closed position and is set in a opened position against the spring force under a pressure of not less than a predetermined level. The bypass valve 116 may alternatively be a solenoid-operated valve that is switched on and off by the instruction from the electronic control unit.

The structure of FIG. 26 carries out a catalyst warm-up control based on the flowchart of FIG. 27. When the program enters the routine of FIG. 27, it is first determined at step S510 whether or not an instruction is output to stop operation of the engine 100. When no instruction is output to stop operation of the engine 100, the program proceeds to step S512 to open both the upstream exhaust pressure control valve 110 and the downstream exhaust pressure control valve 112 and allow a normal flow of the gaseous exhausts.

When an instruction is output to stop operation of the engine 100 at step S510, on the other hand, the program proceeds to step S514 to close the downstream exhaust pressure control valve 112. At subsequent step S516, the engine speed NE based on a detection signal from an engine speed sensor is compared with a predetermined value NEx. In case that the engine speed NE becomes equal to or less than the predetermined value NEx, the program goes to step S518 to close the upstream exhaust pressure control valve 110. While the engine 100 is rotated by the force of inertia after the output of an instruction to stop the engine 100, only the downstream exhaust pressure control valve 112 is set in the closed position. When the engine 100 actually stops, the upstream exhaust pressure control valve 110 is also set in the closed position. When it is determined that an instruction to stop the engine 100 is cancelled at step S510, both the upstream exhaust pressure control valve 110 and the downstream exhaust pressure control valve 112 are turned to the opened position at step S512.

In case that an instruction is output to stop the engine 100 and the downstream exhaust pressure control valve 112 is set in the closed position, the catalyst 104a is kept in an atmosphere of the hot gaseous exhausts. When the engine 100 passes through the motoring state, the upstream exhaust pressure control valve 110 is set in the closed position. This enables the catalyst 104a to be kept in an atmosphere of the hot gaseous exhausts under a predetermined or higher pressure in the exhaust conduit 102 that is sealed by the upstream and the downstream exhaust pressure control valves 110 and 112. The catalyst 104a is accordingly kept warm by the hot gaseous exhausts and maintains a high conversion efficiency after a restart of the engine 100.

Both the upstream exhaust pressure control valve 110 and the downstream exhaust pressure control valve 112 are set in the opened position during the operation of the engine 100 and at the time of restarting the engine 100. This enables the gaseous exhausts to be discharged to the atmosphere, thereby not lowering the driving performance and the starting performance of the engine 100.

When the downstream exhaust pressure control valve 112 is set in the closed position and the internal pressure of the exhaust conduit 102 rises to or above a predetermined value, the bypass valve 116 is opened to release the internal pressure of the exhaust conduit 102 between the upstream exhaust pressure control valve 110 and the downstream exhaust pressure control valve 112 to the exterior via the bypass conduit 114 and thereby decrease the internal pressure to the predetermined level. Even when the pressure of the gaseous exhausts abnormally increases, for example, due to a malfunction of the downstream exhaust pressure control valve 112, this structure effectively prevents leakage of the gas from the exhaust system and protects the exhaust system from serious damages.

As a modification of the eighth embodiment of FIGS. 26 and 27, a solenoid-operated flow regulation valve for varying and regulating the flow of the gaseous exhausts may be arranged after the catalyst in the exhaust conduit of the engine. In this modified structure, when it is determined that a decrease in engine power lowers the temperature of the gaseous exhausts, the flow regulation valve is operated to vary the flow of the gaseous exhausts and raise the exhaust pressure around the catalyst, thereby enhancing the warm-up effect of the catalyst by the hot gaseous exhausts.

The present invention is not restricted to the above embodiments, but there may be many modifications, changes, and alterations without departing from the scope or spirit of the main characteristics of the present invention.

By way of example, the control procedure of enhancing the engine power and the control procedure of lengthening the overlap period in the valve timing variable mechanism may be combined appropriately according to the driving conditions of the engine.

It should be clearly understood that the above embodiments are only illustrative and not restrictive in any sense. The scope and spirit of the present invention are limited only by the terms of the appended claims.

What is claimed is:

1. A hybrid vehicle, comprising:
    a motor connected to a drive shaft, which drives wheels, for rotating said drive shaft;
    an engine for generating energy required for driving said hybrid vehicle;
    a catalyst disposed in an exhaust conduit of said engine for converting gaseous exhausts;
    a generator driven by the engine; and
    a catalyst temperature control apparatus comprising:
        engine power regulation means for regulating an engine power of said engine;
        exhaust temperature detection means for measuring a temperature of either one of said gaseous exhausts and said catalyst; and
        engine power control means for, when the temperature measured by said exhaust temperature detection means is not higher than a predetermined value, carrying out a transient control that temporarily increases the engine power to raise the temperature of said gaseous exhausts via said engine power regulation means so that the temperature of the catalyst is increased to the predetermined value, wherein the transient control carried out by said engine power control means regulates an amount of electricity generated by said generator.

2. The hybrid vehicle in accordance with claim 1, wherein the transient control carried out by said engine power control means increases an engine torque while keeping an engine speed at a substantially constant level.

3. The hybrid vehicle in accordance with claim 2, further comprising a storage battery being charged with the electricity generated by said generator, wherein the transient control carried out by said engine power control means enables said storage battery to be charged with the electricity generated by said generator.

4. The hybrid vehicle in accordance with claim 1, wherein the transient control carried out by said engine power control means increases an engine speed while keeping an engine torque at a substantially constant level.

5. The hybrid vehicle in accordance with claim 4, further comprising a storage battery being charged with the electricity generated by said generator, wherein the transient control carried out by said engine power control means enables said storage battery to be charged with the electricity generated by said generator.

6. The catalyst temperature control apparatus for a hybrid vehicle having a motor connected to a drive shaft, which drives wheels, for rotating said drive shaft; an engine for generating energy required for driving said hybrid vehicle; and a catalyst disposed in an exhaust conduit of said engine for converting gaseous exhausts, said catalyst temperature control apparatus comprising:
    engine power regulation means for regulating an engine power of said engine;
    exhaust temperature detection means for measuring a temperature of either one of said gaseous exhausts and said catalyst;
    engine power control means for, when the temperature measured by said exhaust temperature detection means is not higher than a predetermined value, carrying out a transient control that temporarily increases the engine power to raise the temperature of said gaseous exhausts, via said engine power regulation means;

a generator driven by said engine;

a storage battery being charged with the electricity generated by said generator; and remaining charge detection means for measuring a remaining charge of said storage battery, wherein the transient control carried out by said engine power control means is based on the remaining charge measured by said remaining charge detection means, so as to increase an engine torque while keeping an engine speed at a substantially constant level when the remaining charge is not less than a predetermined level, and increase the engine speed while keeping the engine torque at a substantially constant level when the remaining charge is less than said predetermined level.

7. The catalyst temperature control apparatus in accordance with claim 6, wherein said exhaust temperature detection means comprises temperature estimation means for estimating the temperature of either one of said gaseous exhausts and said catalyst based on a driving state of said engine.

8. The catalyst temperature control apparatus in accordance with claim 6, wherein said exhaust temperature detection means comprises: temperature detection means for directly measuring a first temperature of either one of said gaseous exhausts and said catalyst and outputting said first temperature; and temperature estimation means for estimating a second temperature of either one of said gaseous exhausts and said catalyst based on a driving state of said engine and outputting second temperature, when a difference between said first temperature detected by said temperature detection means and said second temperature estimated by said temperature estimation means is not less than a predetermined level, said exhaust temperature detection means output said second temperature.

9. The catalyst temperature control apparatus in accordance with claim 6, wherein said predetermined level is a learned value obtaining by learning the difference between said first temperature and said second temperature.

* * * * *